(12) United States Patent
Oh et al.

(10) Patent No.: US 12,477,506 B2
(45) Date of Patent: Nov. 18, 2025

(54) METHOD AND DEVICE FOR ULTRA WIDE BAND (UWB) COMMUNICATION

(71) Applicant: Samsung Electronics Co., Ltd., Gyeonggi-do (KR)

(72) Inventors: Hyunseob Oh, Gyeonggi-do (KR); Jonghoe Koo, Gyeonggi-do (KR); Jinwook Seo, Gyeonggi-do (KR); Mingyu Lee, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 322 days.

(21) Appl. No.: 18/071,995

(22) Filed: Nov. 30, 2022

(65) Prior Publication Data

US 2023/0171729 A1 Jun. 1, 2023

(30) Foreign Application Priority Data

Nov. 30, 2021 (KR) .................. 10-2021-0168713

(51) Int. Cl.
*H04W 64/00* (2009.01)
*H04L 5/00* (2006.01)
*H04W 72/0446* (2023.01)

(52) U.S. Cl.
CPC ......... *H04W 64/003* (2013.01); *H04L 5/0048* (2013.01); *H04W 72/0446* (2013.01)

(58) Field of Classification Search
CPC . H04W 64/003; H04W 72/0446; H04W 4/80; H04W 56/002; H04W 74/04;

(Continued)

(56) References Cited

U.S. PATENT DOCUMENTS 8,576,829 B2 * 11/2013 Aljadeff ............... H04W 64/00
 370/350
9,913,244 B2 * 3/2018 Markhovsky ......... H04W 4/023
(Continued)

FOREIGN PATENT DOCUMENTS

KR 10-2014-0135569 11/2014
KR 1020210020616 2/2021
(Continued)

OTHER PUBLICATIONS

Lang Ruan et al., "Cooperative Relative Localization for UAV Swarm in GNSS-Denied Environment: A Coalition Formation Game Approach", Jul. 1, 2022, 18 pages.
(Continued)

*Primary Examiner* — Kabir A Timory
(74) *Attorney, Agent, or Firm* — The Farrell Law Firm, P.C.

(57) ABSTRACT

The disclosure provides a method for spatial reuse of time resources. A method performed by a UWB device includes receiving, from a first initiator anchor, a first poll message to initiate a DL-TDoA for a first cluster to which the first initiator anchor belongs, the first initiator anchor providing a time reference for an inter-cluster synchronization; performing the inter-cluster synchronization for using a common ranging block, based on the first poll message; and transmitting a second poll message to initiate a DL-TDoA for a second cluster to which the UWB device belongs. The first poll message is transmitted in a first ranging round in the common ranging block, and the first poll message is transmitted in a second ranging round in the common ranging block.

20 Claims, 23 Drawing Sheets

(58) Field of Classification Search
CPC .......... H04W 56/0015; H04W 74/0808; H04L 5/0048; G01S 5/0236; G01S 5/10
See application file for complete search history.

(56) References Cited

U.S. PATENT DOCUMENTS

| | | | |
|---|---|---|---|
| 10,039,069 B2* | 7/2018 | Lee | H04W 72/20 |
| 11,082,809 B1 | 8/2021 | Burowski et al. | |
| 2012/0280714 A1* | 11/2012 | Silverman | G01S 5/06 |
| | | | 326/93 |
| 2014/0342670 A1 | 11/2014 | Kang et al. | |
| 2018/0039287 A1 | 2/2018 | Shattil | |
| 2020/0106877 A1 | 4/2020 | Ledvina et al. | |
| 2022/0174626 A1 | 6/2022 | Yang et al. | |
| 2023/0141919 A1 | 5/2023 | Jeon et al. | |

FOREIGN PATENT DOCUMENTS

| | | |
|---|---|---|
| WO | WO 2016/0065368 | 4/2016 |
| WO | WO 2021/089195 | 5/2021 |
| WO | WO 2021/215686 | 10/2021 |

OTHER PUBLICATIONS

European Search Report dated Dec. 18, 2024 issued in counterpart application No. 22901787.6-1206, 9 pages.
International Search Report dated Mar. 7, 2023 issued in counterpart application No. PCT/KR2022/019244, 6 pages.

* cited by examiner

| Octets: 2 | 0/1 | 0/2/6 | 0/1/2/6 | 0/1 | variable | variable | 2/4 |
|---|---|---|---|---|---|---|---|
| Frame Control | Sequence Number | Destination Address | Source Address | Auxiliary Security Header | Header IE (s) | Payload IE (s) | FCS |
| MAC header | | | | | | MAC payload | MAC footer |

FIG. 4

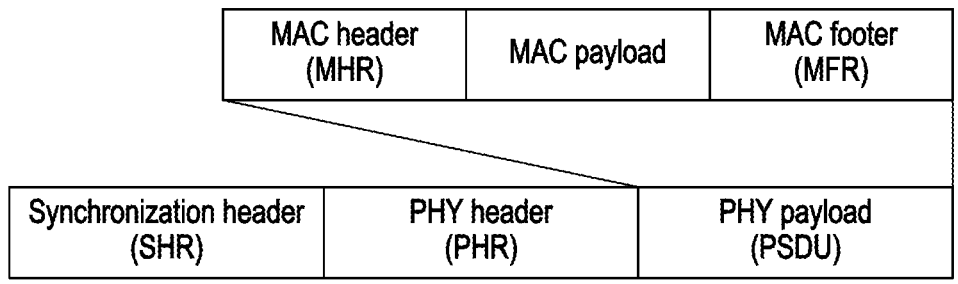
(a)
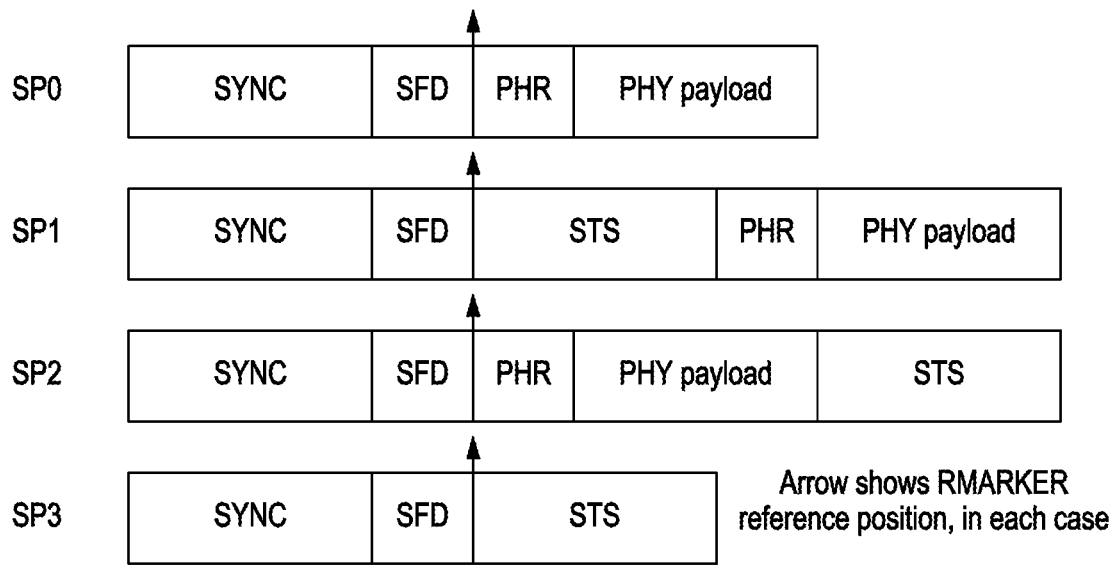
(b)
FIG. 5

| Cluster #0 (round #0) | Cluster #1 (round #1) | Cluster #2 (round #2) | Cluster #3 (round #3) | Cluster #4 (round #4) | Cluster #5 (round #5) |
|---|---|---|---|---|---|
| Cluster #15 (round #7) | Group #0 ||||Cluster #6 (round #6)|
| Cluster #14 (round #6) | Group #1 ||||Cluster #7 (round #7)|
| Cluster #13 (round #5) | Cluster #12 (round #4) | Cluster #11 (round #3) | Cluster #10 (round #2) | Cluster #9 (round #1) | Cluster #8 (round #0) |

Spatial reuse of time resources (e.g., ranging rounds)

FIG. 9

Group #0 ↓

| Cluster #0 (round #0) | Cluster #1 (round #1) | Cluster #2 (round #2) | Cluster #3 (round #3) | Cluster #4 (round #4) | Cluster #5 (round #5) | Cluster #6 (round #6) |
|---|---|---|---|---|---|---|
| Cluster #15 (round #7) | Interference/collision occurs |||||Cluster #7 (round #7)|
| Cluster #14 (round #6) | Cluster #13 (round #5) | Cluster #12 (round #4) | Cluster #11 (round #3) | Cluster #10 (round #2) | Cluster #9 (round #1) | Cluster #8 (round #0) |

↑ Group #1

FIG. 10

| Parameters | Size (Bits) | Notes |
|---|---|---|
| Vendor OUI | 24 | |
| UWB message ID | 4 | |
| ... | ... | ... |
| # ranging round | 8 | 20 |
| Busy round bitmap | 32 | 1101111110000... |

FIG. 13

| Anchor Index | Time, Role(s) |
|---|---|
| 0 | {round index #0, Initiator} |
| 1 | {round index #0, Responder} |
| 2 | {round index #0, Responder} |
| 3 | {round index #0, Responder}, {round index #1, Initiator} |
| ... | ... |

FIG. 14

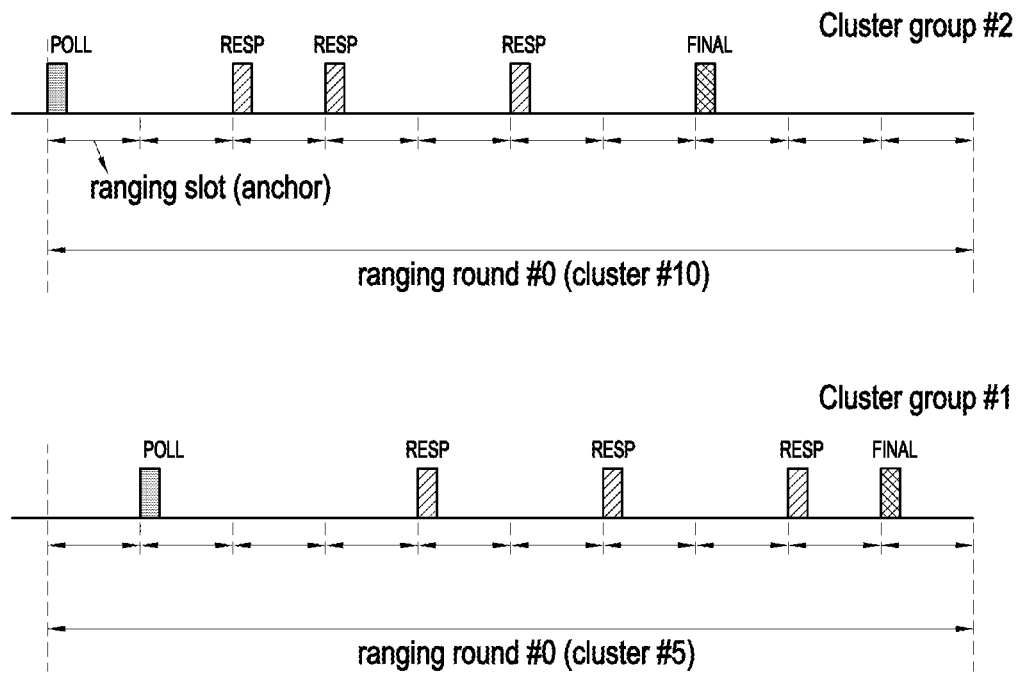
FIG. 17A
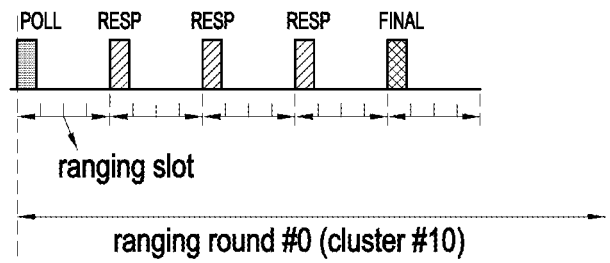
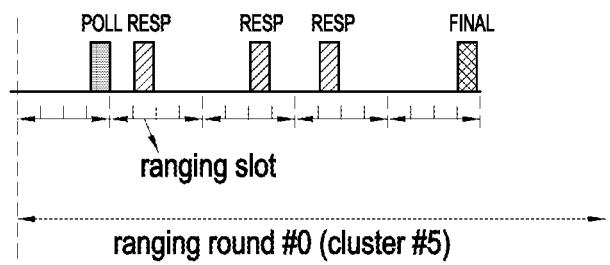
FIG. 17B

| Parameters | Size (Octets) | Notes |
|---|---|---|
| Group ID | 1 | |
| Cluster ID | 1 | |
| Total number of spatial reuse factors | 1 | Total number of active ranging rounds |
| Content control | 1 | |
| Ranging block duration (RBD) | 0/3 | |
| Ranging round duration (RRD) | 0/1 | |
| Ranging slot duration (RSD) | 0/2 | |
| Ranging sub-slot duration (RSSD) | 0/2 | |
| Ranging sub-slot offset (RSSO) | 0/1 | |

FIG. 18A

| Bits: 0 | 1 | 2 | 3 | 4 | 5-7 |
|---|---|---|---|---|---|
| RBDP* | RRDP | RSDP | RSSDP | RSSOP | Reserved |

FIG. 18B

| Parameters | Size (Bits) | Notes |
|---|---|---|
| Vendor OUI | 24 | |
| UWB message ID | 4 | |
| Reserved | 4 | |
| Message control | 16 | |
| Block index | 16 | |
| Round index | 16 | |
| TX Timestamp | 64 | |
| Ranging device management (RDM) list | 0/24*N | N: Number of RDM list elements |
| CFO | 0/16 | |
| Reply time list | 0/48*M | M: Number of Reply Time List elements |
| (New) Control message | variable | New control message for spatial reuse support |

FIG. 19A

| Parameters | Size (Bits) | Notes |
|---|---|---|
| RDM list length | 4 | |
| Reply time list length | 4 | |
| CFO present | 1 | |
| (New) Control message present | 1 | |

FIG. 19B

METHOD AND DEVICE FOR ULTRA WIDE BAND (UWB) COMMUNICATION

CROSS-REFERENCE TO RELATED APPLICATION(S)

This application is based on and claims priority under 35 U.S.C. § 119 to Korean Patent Application No. 10-2021-0168713, which was filed in the Korean Intellectual Property Office on Nov. 30, 2021, the entire disclosure of which is incorporated herein by reference.

BACKGROUND

1. Field

The disclosure relates generally to ultra-wideband (UWB) communication and, more specifically, to methods and devices for spatial reuse of time resources in UWB communication.

2. Description of Related Art

The Internet is evolving to the Internet of things (IoT) in which distributed entities, i.e., things, exchange and process information without human intervention. The Internet of everything (IoE), which is a combination of the IoT technology and Big Data processing technology through a connection with a cloud server, has emerged. As technology elements, such as "sensing technology", "wired/wireless communication and network infrastructure", "service interface technology", and "Security technology" have been demanded for IoT implementation, sensor networks, machine-to-machine (M2M) communication, machine type communication (MTC), etc., are being researched.

An IoT environment may provide intelligent Internet technology services that by collecting and analyzing data generated among connected things. IoT may be applied to a variety of fields including smart homes, smart buildings, smart cities, smart or connected cars, smart grids, health care, smart appliances, and advanced medical services through convergence and combination between existing information technology (IT) and various industrial applications.

As various services can be provided with the development of wireless communication systems, methods for effectively providing these services are also required. For example, a ranging technique for measuring a distance between electronic devices using UWB) may be used.

SUMMARY

The disclosure has been made to address the above-mentioned problems and disadvantages, and to provide at least the advantages described below.

An aspect of the disclosure provides methods and devices for spatial reuse of time resources.

In accordance with an aspect of the disclosure, a method performed by a UWB device is provided, which includes receiving, from a first initiator anchor, a first poll message to initiate a downlink (DL)-time difference of arrival (TDoA) for a first cluster to which the first initiator anchor belongs, the first initiator anchor providing a time reference for an inter-cluster synchronization; performing the inter-cluster synchronization for using a common ranging block, based on the first poll message; and transmitting a second poll message to initiate a DL-TDoA for a second cluster to which the UWB device belongs. The first poll message is transmitted in a first ranging round in the common ranging block. The first poll message is transmitted in a second ranging round in the common ranging block. The first poll message includes block index information indicating a block index of the common ranging block, round index information indicating a round index of the first ranging round, and transmission timestamp information indicating a transmission timestamp of the first poll message.

In accordance with another aspect of the disclosure, a method performed by a UWB device is provided, which includes transmitting a first poll message to initiate a DL-TDoA for a first cluster to which the first initiator anchor belongs, the UWB device being configured as a initiator anchor providing a time reference for an inter-cluster synchronization and the inter-cluster synchronization being performed for using a common ranging block; and receiving, from at least one responder anchor, a first response message corresponding to the first poll message. The first poll message is transmitted in a first ranging round in the common ranging block. The first poll message includes block index information indicating a block index of the common ranging block, round index information indicating a round index of the first ranging round, and transmission timestamp information indicating a transmission timestamp of the first poll message. In accordance with another aspect of the disclosure, a UWB device is provided, which includes a transceiver and at least one processor configured to receive, from a first initiator anchor, a first poll message to initiate a DL-TDoA for a first cluster to which the first initiator anchor belongs, the first initiator anchor providing a time reference for an inter-cluster synchronization, perform the inter-cluster synchronization for using a common ranging block, based on the first poll message, and transmit a second poll message to initiate a DL-TDoA for a second cluster to which the UWB device belongs. The first poll message is transmitted in a first ranging round in the common ranging block. The first poll message is transmitted in a second ranging round in the common ranging block. The first poll message includes block index information indicating a block index of the common ranging block, round index information indicating a round index of the first ranging round, and transmission timestamp information indicating a transmission timestamp of the first poll message.

Through the various embodiments of the disclosure, it is possible to increase the efficiency of resource use by spatially reuse the same time resource.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 illustrates a UWB medium access control (MAC) frame according to an embodiment;

FIG. 5 illustrates a structure of a UWB PHY packet according to an embodiment;

FIG. 9 illustrates a cluster deployment structure for spatial reuse of time resources according to an embodiment;

FIG. 10 illustrates interference and collision in a cluster deployment structure for spatial reuse of time resources according to an embodiment;

FIG. 13 illustrates a UWB message used to determine a reference time for time synchronization according to an embodiment;

FIG. 14 illustrates scheduling information used for scheduling a UWB anchor for time synchronization according to an embodiment;

FIG. 17A illustrates a method for applying a slot level transmission offset according to an embodiment;

FIG. 17B illustrates a method for applying a subslot level transmission offset according to an embodiment;

FIG. 18A illustrates control message information for a DL TDoA message for spatial reuse according to an embodiment;

FIG. 18B illustrates a content control field (Content control) included in the control message information of FIG. 18A;

FIG. 19A illustrates a DL TDoA message including control message information according to an embodiment;

FIG. 19B illustrates a message control field (message control) included in the DL TDoA message of FIG. 19A;

DETAILED DESCRIPTION

Figure 1:
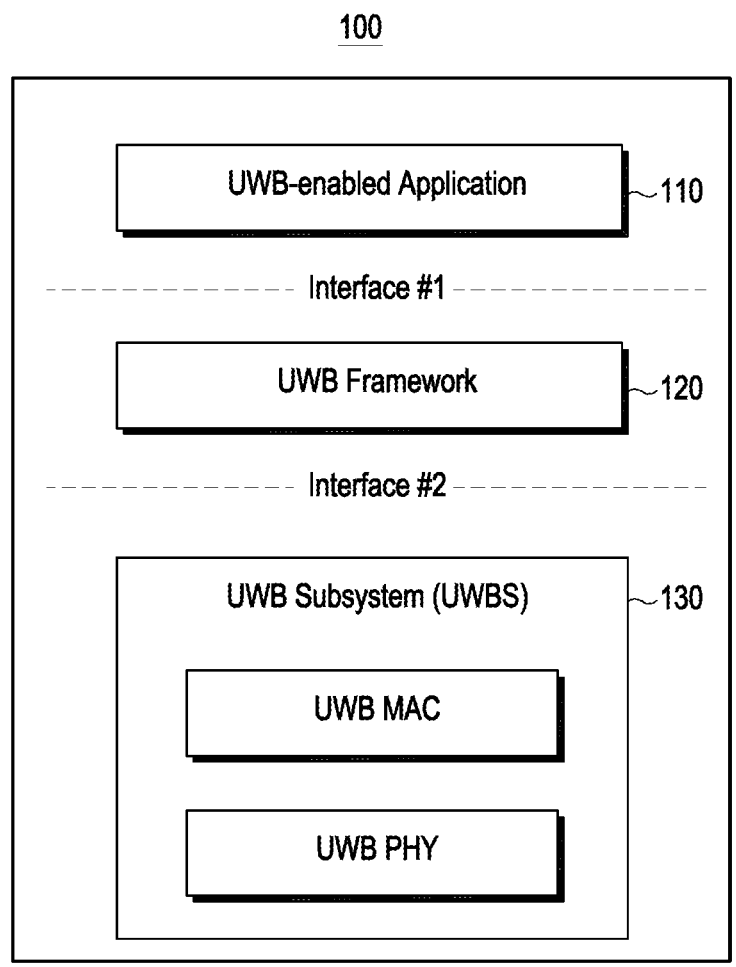
FIG. 1 illustrates a UWB device according to an embodiment.

Hereinafter, various embodiments of the disclosure are described in detail with reference to the accompanying drawings.

In describing embodiments, descriptions of technologies that are known in the art and are not directly related to the disclosure are omitted in order to avoid obscuring the disclosure unclearing unnecessary detail.

In the drawings, some elements may be exaggerated or schematically shown. Further, the size of each element does not necessarily reflect the real size of the element. The same or similar reference numerals may be used to refer to the same or similar elements throughout the drawings.

Various advantages and features of the disclosure, and methods for achieving the same may be understood through the embodiments to be described below, taken in conjunction with the accompanying drawings. However, the disclosure is not limited to the embodiments disclosed herein, and various changes may be made thereto. The embodiments disclosed herein are provided to inform one of ordinary skilled in the art of the category of the disclosure. The disclosure is defined by the appended claims Blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). In some replacement execution examples, the functions mentioned in the blocks may occur in different orders. For example, two blocks that are consecutively shown may be performed substantially simultaneously or in a reverse order depending on corresponding functions.

As used herein, the term "unit" may refer to a software element or a hardware element such as a field-programmable gate array (FPGA) or an application specific integrated circuit (ASIC). A unit plays a certain role. However, the term "unit" is not limited as meaning a software or hardware element. A "unit" may be configured in a storage medium that may be addressed or may be configured to reproduce one or more processors. For example, a "unit" includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a unit may be combined with additional elements or may be split into sub elements or sub units. Further, an element or a unit may be implemented to reproduce one or more central processing units (CPUs) in a device or a security multimedia card. A unit may include one or more processors.

As used herein, the term terminal or device may include a mobile station (MS), a user equipment (UE), a user terminal (UT), terminal, a wireless terminal, an access terminal (AT), a subscriber unit, a subscriber station, a wireless device, a wireless communication device, a wireless transmit/receive unit (WTRU), a mobile node, a mobile, etc. A terminal may also include cellular phones, smart phones with wireless communication capabilities, personal digital assistants (PDAs) with wireless communication capabilities, wireless modems, portable computers with wireless communication capabilities, capturing/recording/shooting/filming devices, such as digital cameras, having wireless communication capabilities, game players with wireless communications capabilities, music storage and playback home appliances with wireless communications capabilities, Internet home appliances capable of wireless Internet access and browsing, or portable units or terminals incorporating combinations of those capabilities. Further, a terminal may include an M2M terminal and an MTC terminal/device, but is not limited thereto. In the disclosure, the terminal may be referred to as an electronic device or simply as a device.

The terms as used herein are defined considering the functions in the disclosure and may be replaced with other terms according to the intention or practice of the user or operator. Therefore, the terms should be defined based on the overall disclosure.

A communication system using UWB is described in connection with embodiments of the disclosure, as an example, embodiments of the disclosure may also apply to other communication systems with similar technical background or features. For example, a communication system using Bluetooth™ or ZigBee™ may be included therein. Further, embodiments of the disclosure may be modified in such a range as not to significantly depart from the scope of the disclosure under the determination by one of ordinary skill in the art and such modifications may be applicable to other communication systems.

In general, wireless sensor network technology is divided into a wireless local area network (WLAN) technology and a wireless personal area network (WPAN) technology according to the recognition distance. WLAN is a technology based on IEEE 802.11 that allows access to a backbone network within a radius of about 100 m. WPAN is a technology based on IEEE 802.15 which includes Bluetooth™, ZigBee™, and UWB.

A wireless network in which such a wireless network technology is implemented may include a plurality of electronic devices.

According to definitions by the Federal Communications Commission (FCC), UWB may refer to a wireless communication technology that uses a bandwidth of 500 MHz or more or a bandwidth corresponding to a center frequency of 20% or more. A UWB may refer a band itself to which UWB communication is applied. UWB may provide secure and accurate ranging between devices. Thus, UWB allows for relative position estimation based on the distance between two devices or accurate position estimation of a device based on the distance from fixed devices (whose positions are known).

The terminology used herein is provided for a better understanding of the disclosure, and changes may be made thereto without departing from the technical spirit of the disclosure.

Application dedicated file (ADF): a data structure in an application data structure that may host an application or application specific data.

Application protocol data unit (APDU): a command and a response used when communicating with the application data structure in the UWB device.

Application specific data: a file structure having a root level and an application level including UWB controllee information and UWB session data for a UWB session.

Controller: a ranging device that defines and controls ranging control messages (RCM) (or control messages).

Controllee: a ranging device using a ranging parameter in the RCM (or control message) received from the controller.

Dynamic STS mode: an operation mode in which an STS is not repeated during a ranging session. In this mode, the STS may be managed by the ranging device, and the ranging session key that generates STS may be managed by a secure component.

Applet: a small application executed on a secure component including UWB parameters and service data. Herein, an applet may be a fine ranging (FiRa) applet.

Ranging device: a device capable of performing UWB ranging. A ranging device may be an enhanced ranging device (ERDEV) as defined in IEEE 802.15.4z or a FiRa device. A ranging device may also be referred to as a UWB device.

UWB-enabled application: an application for UWB service. For example, the UWB-enabled application may be an application using a framework application programming interface (API) for configuring an out-of-band (OOB) connector, a secure service, and/or a UWB service for a UWB session. A UWB-enabled application may also be referred to as an application or a UWB application. A UWB-enabled application may be a FiRa-enabled application.

Framework: a component that provides access to profiles, individual-UWB configuration and/or notifications. Framework may include a collection of logical software components including a profile manager, an OOB connector, a secure service, and/or a UWB service. Framework may include a FiRa framework.

OOB connector: a software component for establishing an (OOB connection (e.g., Bluetooth™ low energy (BLE) connection) between ranging devices. An OOB connector may be a FiRa OOB connector.

Profile: a previously defined set of UWB and OOB configuration parameters, a FiRa profile.

Profile manager: a software component that implements a profile available on a ranging device, e.g., a FiRa profile manager.

Service: an implementation of a use case that provides a service to an end-user.

Smart ranging device: a ranging device that may implement an optional framework API, e.g., a FiRa smart device.

Global dedicated file (GDF): a root level of application specific data including data required to establish a USB session.

Framework API: an API used by a UWB-enabled application to communicate with the Framework.

Initiator: a ranging device that initiates a ranging exchange.

Object identifier (OID): an identifier (ID) of an ADF in an application data structure.

OOB: data communication that does not use UWB as an underlying wireless technology.

Ranging data set (RDS): data (e.g., a UWB session key, a session ID, etc.) used to establish a UWB session to protect confidentiality, authenticity and integrity.

Responder: a ranging device that responds to an initiator in a ranging exchange.

STS: a ciphered sequence for increasing the integrity and accuracy of ranging measurement timestamps. The STS may be generated from a ranging session key.

Secure channel: a data channel that prevents overhearing and tampering.

Secure component: an entity (e.g., a secure element (SE) or a trusted execution environment (TEE)) having a defined security level that interfaces with a UWB subsystem (UWBS) for providing an RDS to a UWBS, e.g., when dynamic STS is used.

SE: a tamper-resistant secure hardware component that may be used as a secure component in a ranging device.

Secure ranging: ranging based on STS generated through a strong encryption operation.

Secure Service: a software component for interfacing with a secure component, such as an SE or a TEE).

Service applet: an applet on a secure component that handles service specific transactions.

Service data: data defined by a service provider that is to be transferred between two ranging devices to implement a service.

Service provider: an entity that defines and provides hardware and software to provide a specific service to an end-user.

Static STS mode: an operation mode in which STS is repeated during a session, and does not need to be managed by an secure component.

Secure UWB service (SUS) apple: an applet on an SE that communicates with the applet to retrieve data for secure UWB sessions with other ranging devices. The SUS applet may transfer corresponding data (information) to the UWBS.

UWB service: a software component that provides access to a UWBS.

UWB session: a period from when a controller and a controllee start communication through UWB until the communication stops. A UWB session may include ranging, data transfer, or both ranging and data transfer.

UWB session ID: an ID (e.g., a 32-bit integer) that identifies a UWB session, shared between a controller and a controller.

UWB session key: a key used to protect a UWB Session. A UWB Session Key may be used to generate an STS. A UWB session key may be a UWB ranging session key (URSK), and may be abbreviated as a session key.

UWBS: a hardware component implementing UWB PHY and MAC layers specifications. A UWBS may have an interface to a framework and an interface to a secure component to search for RDS. The UWB PHY and MAC specifications may be, e.g., FiRa PHY and FiRa MAC specifications referring to IEEE 802.15.4/4z.

UWB message: a message including a payload information element (IE) transmitted by the UWB device (e.g., ERDEV).

Ranging message: a message transmitted by a UWB device (e.g., ERDEV) in a UWB ranging procedure. The ranging message may be a ranging initiation message (RIM), a ranging response message (RRM), a ranging final message (RFM), or a measurement report message (MRM), transmitted by a UWB device (e.g., ERDEV) in a specific phase of a ranging round. A ranging message may include one or more UWB messages. A plurality of ranging messages may be merged into one message. For example, in the case of non-deferred double-sided (DS)-two-way ranging (TWR) ranging, RFM and MRM may be merged into one message in a ranging final phase.

Payload IE: an IE included in a MAC payload of a UWB MAC frame defined in IEEE 802.15.4/4z. The MAC payload may include a plurality of payload IEs.

Data transfer IE: an additional payload IE for transmitting application data. Application data may be data transferred from a framework or application above the UWB MAC layer. The data transfer IE may be used in the procedure for ranging between the initiator and the responder. In this case, the ranging message may include one or both of the payload IE for ranging and the data transfer IE for application data transfer. For example, the data transfer IE may be included and transmitted as part of the payload IE of the MAC payload of an RIM for ranging, an RRM, an RFM, an MRM, and/or a ranging result report message (RRRM). The data transfer IE may be transferred to the payload IE of the MAC payload of a DL TDoA message (DTM). For example, the data transfer IE may be transferred, together with the DTM payload IE, while being attached to the MAC payload portion of a poll DTM, a response DTM, and a final DTM.

UWB channel: one of candidate UWB channels allocated for UWB communication. Candidate UWB channels allocated for UWB communication may be allocated for UWB communication defined in IEEE 802.15.4/4z. The UWB channel may be used for UWB ranging and/or transaction. For example, the UWB channel may be used for transmission/reception of a ranging frame (RFRAME) and/or transmission/reception of a data frame.

Narrow band (NB) channel: a channel having a narrower bandwidth than the UWB channel. The NB channel may be a subchannel of one of the candidate UWB channels allocated for UWB communication. Candidate UWB channels allocated for UWB communication may be allocated for UWB communication defined in IEEE 802.15.4/4z. An NB channel may be used for advertising, device discovery, and/or connection setup for additional parameter negotiation/authentication. For example, an NB channel may be used for transmission and reception of an advertisement message, an additional advertising message, a connection request message, and/or a connection confirmation message.

OWR: a ranging scheme using a TDoA localization method. The TDoA method locates a mobile device (tag device) based on a relative arrival time of a single message or multiple messages. For a description of OWR (TDoA), reference may be made to the description of IEEE 802.15.4z. As an example of an OWR scheme, a DL-TDoA scheme may be included.

TWR: a ranging scheme capable of estimating a relative distance between two devices by measuring time of flight (ToF) through an exchange of ranging messages between the two devices. A TWR scheme may include DS-TWR and single-sided (SS)—TWR. SS-TWR may be a procedure for performing ranging through one round-trip time measurement. DS-TWR may be a procedure for performing ranging through two round-trip time measurements. For a description of SS-TWR and DS-TWR, reference may be made to the description of IEEE 802.15.4z.

DL-TDoA may also be referred to as reverse TDoA, and its default operation may be for a UE (i.e., a tag device) to overhear the message of an anchor device while a plurality of anchor devices broadcast or exchange messages. DL-TDoA may be classified as a type of one way ranging like uplink (UP) TDoA. The UE performing the DL-TDoA operation may overhear the messages transmitted by the two anchor devices to calculate a TDoA proportional to the difference between the distances between each anchor device and the UE. The UE may calculate a relative distance to the anchor device by using TDoA with several pairs of anchor devices and use it for positioning. The operation of the anchor device for DL-TDoA may be similar to that of DS-TWR as defined in IEEE 802.15.4z and may further include other useful time information so that the UE may calculate the TDoA. DL-TDoA may also be referred to as DL-TDoA localization.

Anchor device, DL-TDoA anchor (DT-anchor), anchor, UWB anchor, or UWB anchor device: a UWB device deployed in a specific location to provide a positioning service. For example, an anchor device may be a UWB device installed by a service provider on a wall, ceiling, structure, etc., in a room, to provide an indoor positioning service. Anchor devices may be divided into initiator anchors and responder anchors according to the order and role of transmitting messages.

Initiator anchor, initiator DT-anchor, initiator UWB anchor, or initiator anchor device: an anchor device that announces a start of a specific ranging round. The initiator anchor may schedule a ranging slot for the responder anchors operating in the same ranging round to respond. The initiation message of the initiator anchor may be referred to as an initiator DTM, a poll DTM, or a poll message. The initiation message of the initiator anchor may include a transmission timestamp. The initiator anchor may additionally transfer an end message after receiving responses from the responder anchors. The end message of the initiator anchor may be referred to as an final DTM or a final message. The end message may include the time of the reply to the messages sent by the responder anchors. The end message may include a transmission timestamp.

Responder anchor, responder DT-anchor, responder UWB anchor, responder UWB anchor device, or responder anchor device: an anchor device that responds to an initiation message of an initiator anchor. The message with which the responder anchor responds may include the time of reply to the initiation message. The message with which the responder anchor responds may be referred to as a responder DTM, a response DTM, or a response message. The response message of the responder anchor may include a transmission timestamp.

Cluster: a set of UWB anchors covering a specific area. A cluster may include an initiator UWB anchor and responder UWB anchors responding thereto. For two-dimensional (2D) positioning, one initiator UWB anchor and at least three responder UWB anchors are typically required and, for three-dimensional (3D) positioning, one initiator UWB anchor and at least four responder UWB anchors are typically required. If the initiator UWB anchor and the responder UWB anchor may be accurately time-synchronized through a separate wired/wireless connection, one initiator UWB anchor and two responder UWB anchors may be used for 2D positioning, and one initiator UWB anchor and three responder UWB anchors may be for 3D positioning. Unless otherwise stated, it is assumed that there is no separate device for wired/wireless time synchronization between UWB anchors. The cluster area may be a space formed by the UWB anchors constituting the cluster. To support the positioning service for a wide area, a plurality of clusters may be configured to provide the positioning service to the UE. A cluster may also be referred to as a cell. An operation of the cluster may be understood as the operation of anchor(s) belonging to the cluster.

Active ranging round: a ranging round operating in an active state. In an active ranging round, anchor devices may exchange DL-TDoA messages, and the tag device (i.e., a UE) may overhear the message transmitted by the anchor device. The active ranging round may be referred to as an active round.

In-active ranging round: a ranging round operating in an in-active state or sleep state. In the in-active ranging round, anchor devices do not exchange DL-TDoA messages, and the tag device may be in a sleep state. The in-active ranging round may be referred to as a sleep ranging round, an in-active round, or a sleep round.

Reference clock: a common clock that allows the anchors (DT-anchors) and tags (DT-tags) of a DL-TDoA system to operate in sync with each other and allows the DT-tag to obtain a correct TDoA value. Since DT-anchors and DT-tags are different terminals and operate with different crystal oscillators, there may be a slight difference in clock speed and, since the power supply time differs, the clock origin may be different. Therefore, a mechanism to maintain the same clock throughout the system may be required, which may be called time synchronization. Time synchronization between the components in the cluster may be referred to as intra-cluster synchronization, and the operation in which the plurality of responder anchors constituting one cluster sync with the clock of the initiator anchor of the same cluster may be referred to as intra-cluster synchronization. Synchronizing between adjacent clusters may be referred to as inter-cluster synchronization, and maintaining the same ranging block structure between the initiator anchors of the adjacent clusters may be referred to as inter-cluster synchronization. In the cluster, the clock of the initiator anchor may be a reference clock and, in the entire system, the clock of one specific initiator anchor may be a reference clock.

Global controller: a UWB terminal that may set the order of operation of the DT-anchors constituting the downlink TDoA system, the structure of the cluster, and the reference clock. The global controller may be one of the DT-anchors, and there may be a plurality of global controllers in the same system. The global controller may be a initiator DT-anchor which acts as a time reference in a DL-TDoA network (infra). The global controller may generate a common ranging block (or, a common ranging block structure), to which other initiator DT-anchors synchronizes, by transmitting a poll DTM in the first ranging slot (i.e., ranging slot index 0) in a corresponding ranging round. The global controller may refer to a reference DT-anchor or a reference initiator DT-anchor.

FIG. 1 illustrates a UWB device according to an embodiment.

Referring to FIG. 1, the UWB device 100 may be an electronic device supporting UWB communication. The UWB device 100 may be, e.g., a ranging device supporting UWB ranging, such as an ERDEV as defined in IEEE 802.15.4z or a FiRa device.

The UWB device 100 may interact with other UWB devices through a UWB session.

The UWB device 100 includes a UWB-enabled application 110, a framework (or UWB framework) 120, and a UWBS 130 including a UWB MAC Layer and a UWB Physical Layer. Depending on the embodiment, some entities may not be included in the UWB device, or additional entities (e.g., security layer) may be further included.

The UWB device 100 implements a first interface (Interface #1) between the UWB-enabled application 110 and the framework 120. The first interface allows the UWB-enabled application 110 on the UWB device 100 to use the UWB capabilities of the UWB device 100 in a predetermined manner. The first interface may be a framework API or a proprietary interface, but is not limited thereto.

The UWB device 100 implements a second interface (Interface #2) between the UWB Framework 110 and the UWBS 130. The second interface may be a UWB command interface (UCI) or proprietary interface, but is not limited thereto.

The UWB-enabled Application 110 may trigger establishment of a UWB session by a UWBS 130 through the first interface. The UWB-enabled Application 110 may use one of previously defined profiles. For example, the UWB-enabled Application 110 may use one of the profiles defined in FiRa or a custom profile. The UWB-enabled Application 110 may use the first interface to handle related events, such as service discovery, ranging notifications, and/or error conditions.

The framework 120 may provide access to profiles, individual-UWB configurations, and/or notifications. The framework 120 may support at least one of a function for UWB ranging and transaction execution, a function to provide an interface to the application and UWBS 130, or a function to estimate the location of the device 100. The framework 120 may be a set of software components. As described above, the UWB-enabled application 110 may interface with the framework 120 through the first interface, and the framework 120 may interface with the UWBS 130 through the second interface.

The UWB-enabled application 110 and/or framework 120 may be implemented by an application processor (AP) (or a processor). Accordingly, the operation of the UWB-enabled Application 110 and/or the framework 120 may be understood as performed by an AP (or a processor). The framework 120 may be referred to as an AP or a processor.

The UWBS 130 may be a hardware component including a UWB MAC layer and a UWB PHY layer. The UWBS 130 may perform UWB session management and may communicate with the UWBS of another UWB device. The UWBS 130 may interface with the framework 120 through the second interface and may obtain the security data from a secure component. The Framework (or application processor) 120 may transmit a command to the UWBS 130 through a UCI, and the UWBS 130 may transmit a response to the command to the framework 120. The UWBS 130 may transfer a notification to the Framework 120 through the UCI.

Figure 2:
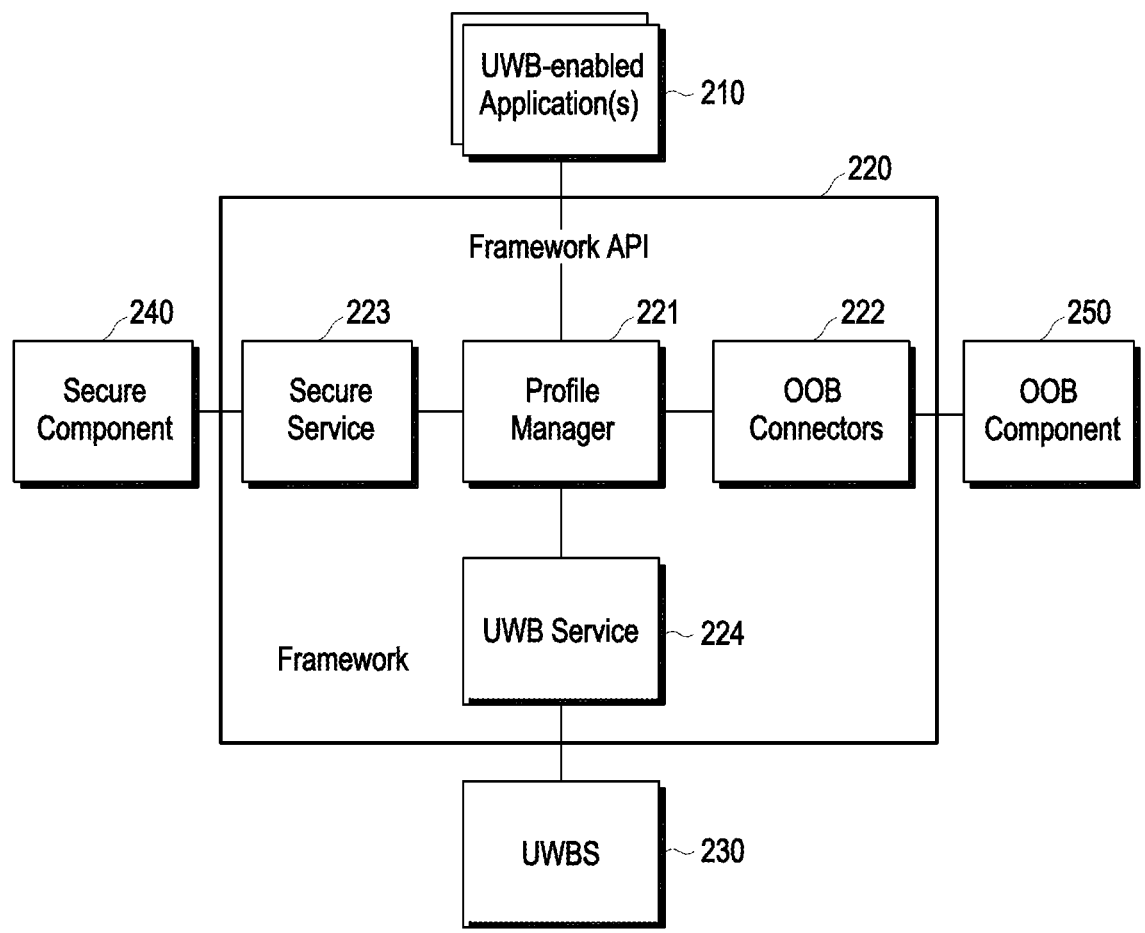
FIG. 2 illustrates a framework of a UWB device according to an embodiment.

FIG. 2 illustrates a framework of a UWB device according to an embodiment. For example, the UWB device of FIG. 2 may be an example of the UWB device 100 of FIG. 1.

Referring to FIG. 2, the Framework 220 includes software components, i.e., a profile manager 221, OOB connector(s) 222, a secure service 223, and a UWB service 224.

The profile manager 221 may manage profiles available on the UWB device. A profile may be a set of parameters used to establish communication between UWB devices. For example, a profile may include a parameter indicating which OOB secure channel is used, a UWB/OOB configuration parameter, a parameter indicating whether the use of a particular secure component is mandatory, and/or a parameter related to the file structure of the ADF. The UWB-enabled application 210 may communicate with the profile manager 221 through the first interface (e.g., a framework API).

The OOB connector 222 may establish an OOB connection with another device. The OOB connector 222 may handle an OOB step including a discovery step and/or a connection step. An OOB component (e.g., a BLE component) 250 may be connected to the OOB connector 222.

The secure service 223 may interface with a secure component 240, such as an SE or a TEE.

The UWB Service 224 may manage the UWBS 230. The UWB service 224 may provide access to the UWBS 230 from the profile manager 221 by implementing the second interface.

Figure 3:
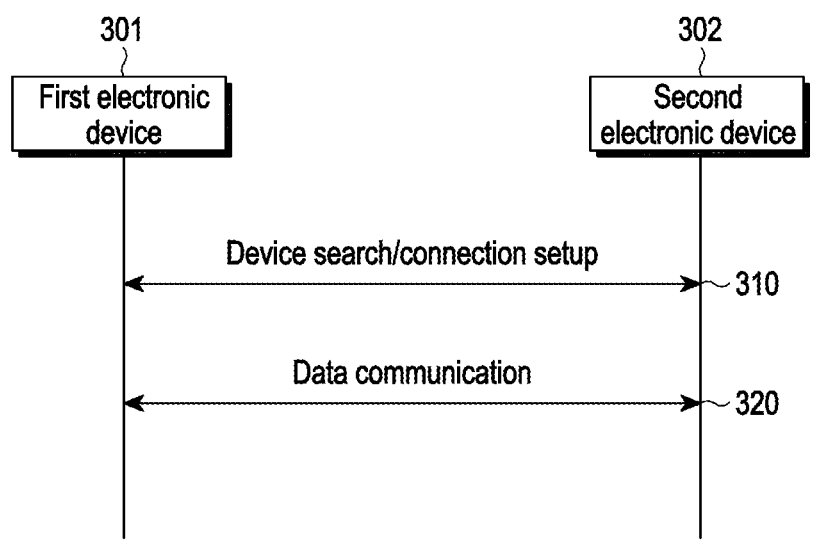
FIG. 3 illustrates a method for performing communication by a plurality of electronic devices according to an embodiment.

FIG. 3 illustrates a method for performing communication by a plurality of electronic devices according to an embodiment. For example, a first electronic device 301 and a second electronic device 302 of FIG. 3 may be the UWB devices of FIG. 1 or 2.

Referring to FIG. 3, the first electronic device 301 and the second electronic device 302 perform a device search/connection setup procedure 310 and a data communication procedure 320. The device search/connection setup procedure 310 and data communication procedure 320 may be managed or controlled by a MAC layer (entity) of the first electronic device 301 or the second electronic device 302.

(1) Device Search/Connection Setup Procedure

The device search/connection setup procedure 310 may be a prior procedure performed before the data communication procedure 320. For example, the device discovery/connection setup procedure 310 may be performed over OOB communication (channel), NB communication (channel), and/or UWB communication (channel).

The device search/connection setup procedure 310 may include at least one of the following operations.

Device discovery operation: An operation in which the electronic device searches for (discovers) another UWB devices. The device discovery operation may include an operation for transmitting/receiving an advertisement message. The device discovery operation may be referred to as a discovery operation or an advertising operation.

Connection setup operation: An operation in which two electronic devices establish a connection. The connection setup operation may include an operation for transmitting/receiving a connection request message and a connection confirmation message. A connection (channel) established through the connection setup operation may be used to configure and control a UWB session for data communication. For example, parameters (e.g., UWB performance parameters (controllee performance parameters), UWB configuration parameters, session key-related parameters) for configuring a UWB session through a secure channel established through the connection setup operation may be negotiated between two electronic devices.

(2) Data Communication Procedure

The data communication procedure 320 may be for transmitting and receiving data using UWB communication. The data communication procedure may be performed by UWB communication or NB communication.

The data communication procedure 320 may include at least one of the following operations.

UWB ranging operation: An operation in which the electronic device performs UWB ranging with another electronic device in a preset UWB ranging scheme (e.g., OWR, SS-TWR, or DS-TWR scheme). The UWB ranging operation may include a ToF measurement operation and/or an AoA measurement operation.

Transaction operation: An operation in which an electronic device exchanges service data with another electronic device.

FIG. 4 illustrates a UWB MAC frame according to an embodiment.

Referring to FIG. 4, the UWB MAC frame includes a MAC header (MHR), a MAC payload, and a MAC footer (MFR).

The UWB MAC frame may follow the MAC frame structure of IEEE 802.15.4z, for example. The UWB MAC frame may be simply referred to as a MAC frame or frame. The UWB MAC frame may be used to transfer UWB data (e.g., UWB message, ranging message, control information, service data, application data, transaction data, etc.).

(1) MAC Header

The MAC header includes a frame control field, a sequence number field, a destination address field, a source address field, an auxiliary security header field, and/or at least one header IE field. Alternatively, some of the illustrated fields may not be included in the MAC header.

The frame control field may include a frame type field, a security enabled field, a frame pending field, an acknowledgement requirement (AR) field, a personal area network (PAN) ID compression field, a sequence number suppression field, an IE present field, a destination addressing mode field, a frame version field, and/or a source addressing mode field.

The frame type field may indicate the frame type. The frame type may include a data type and/or a multipurpose type.

The security enabled field may indicate whether an auxiliary security header field exists. The auxiliary security header field may include information required for security processing.

The frame pending field may indicate whether the device transmitting the frame has more data for the recipient. In other words, the frame pending field may indicate whether there is a pending frame for the recipient.

The AR field may indicate whether acknowledgment for frame reception is required from the recipient.

The PAN ID compression field may indicate whether the PAN ID field exists.

The sequence number suppression field may indicate whether the sequence number field exists. The sequence number field may indicate the sequence identifier for the frame.

The IE present field may indicate whether the header IE field and the payload IE field are included in the frame.

The destination addressing mode field may indicate whether the destination address field may include a short address (e.g., 16 bits) or an extended address (e.g., 64 bits). The destination address field may indicate the address of the recipient of the frame.

The frame version field may indicate the frame version. For example, the frame version field may be set to a value indicating IEEE std 802.15.4z-2020.

The source addressing mode field may indicate whether the source address field exists, and if the source address field exists, whether the source address field includes a short address (e.g., 16 bits) or an extended address (e.g., 64 bits). The source address field may indicate the address of the originator of the frame.

(2) MAC Payload

The MAC payload may include at least one payload IE field. The payload IE field may include a vendor specific nested IE. The payload IE field may include the payload IE field of the UWB message, ranging message, or control message.

(3) MAC Footer

The MAC footer may include a frame check sequence (FCS) field. The FCS field may include a 16-bit CRC or a 32-bit CRC.

FIG. 5 illustrates a structure of a UWB PHY packet according to an embodiment of the disclosure.

Section (a) of FIG. 5 illustrates an example structure of a UWB PHY packet to which the STS packet configuration is not applied, and FIG. (b) of 5 illustrates an example structure of a UWB PHY packet to which the STS packet configuration is applied. Herein, the UWB PHY packet may be referred to as a PHY packet, a PHY PDU (PPDU), or a frame.

Referring to section (a) of FIG. 5, the PPDU includes a synchronization header (SHR), a PHY header (PHR), and a PHY payload (PSDU). The PSDU includes a MAC frame. As illustrated in FIG. 4, the MAC frame includes an MHR, a MAC payload, and an MFR. The synchronization header may be referred to as a preamble, and the PHY header and the PHY payload may be collectively referred to as a data part.

The synchronization header may be used for synchronization for signal reception and may include a SYNC field and a start-of-frame delimiter (SFD).

The SYNC field may include a plurality of preamble symbols used for synchronization between transmission/reception devices. The preamble symbol may be set through one of previously defined preamble codes.

The SFD field may indicate an end of the SHR and a start of the data field.

The PHY header may provide information about the configuration of the PHY payload. For example, the PHY header may include information about the length of the PSDU, information indicating whether the current frame is an RFRAME, etc.

The PHY layer of the UWB device may include an optional mode to provide a reduced on-air time for high density/low power operation. In this case, the UWB PHY packet may include an encrypted sequence (i.e., STS) to increase the integrity and accuracy of the ranging measurement timestamp. An STS may be included in the STS field of the UWB PHY packet and be used for security ranging.

Referring to section (b) of FIG. 5, in the case of STS packet (SP) setting 0 (SP0), the STS field is not included in the PPDU (SP0 packet). In the case of SP setting 1 (SP1), the STS field is positioned immediately after the SFD field and before the PHR field (SP1 packet). In the case of SP setting 2 (SP2), the STS field is positioned after the PHY payload (SP2 packet). In the case of SP setting 3 (SP3), the STS field is positioned immediately after the SFD field, and the PPDU does not include the PHR and data field (PHY payload) (SP3 packet). In other words, in the case of SP3, the PPDU does not include the PHR and PHY payload.

Each UWB PHY packet may include RMARKER for defining a reference time. RMARKER may be used to obtain the transmission time, reception time and/or time range of the ranging message (frame) in the UWB ranging procedure.

Figure 6:
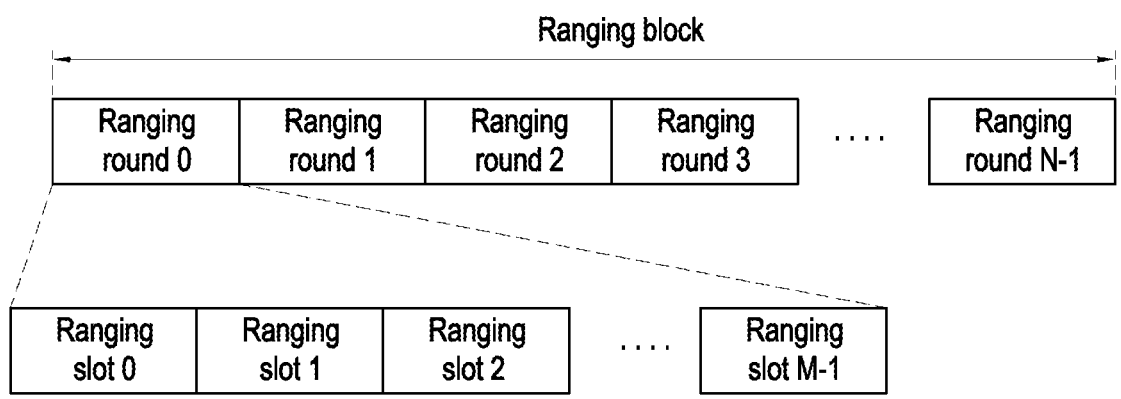
FIG. 6 illustrates a ranging block and round used for UWB ranging according to an embodiment.

FIG. 6 illustrates a ranging block and round used for UWB ranging according to an embodiment.

Referring to FIG. 6, the ranging block refers to a time period for ranging. The ranging round may be a period of sufficient duration to complete one entire range-measurement cycle (ranging cycle) in which a set of UWB devices participating in a ranging exchange involves. The ranging slot may be a sufficient period for transmission of at least one RFRAME (e.g., ranging initiation/reply/final message, etc.).

A ranging block may include at least one ranging round. Each ranging round may include at least one ranging slot.

When the ranging mode is a block-based mode, a mean time between contiguous ranging rounds may be a constant.

Alternatively, when the ranging mode is an interval-based mode, the time between contiguous ranging rounds may be dynamically changed. That is, the interval-based mode may adopt a time structure having an adaptive spacing.

The number and duration of slots included in the ranging round may be changed between ranging rounds.

A ranging block, a ranging round, and a ranging slot may be abbreviated as a block, a round, and a slot.

Figure 7A:
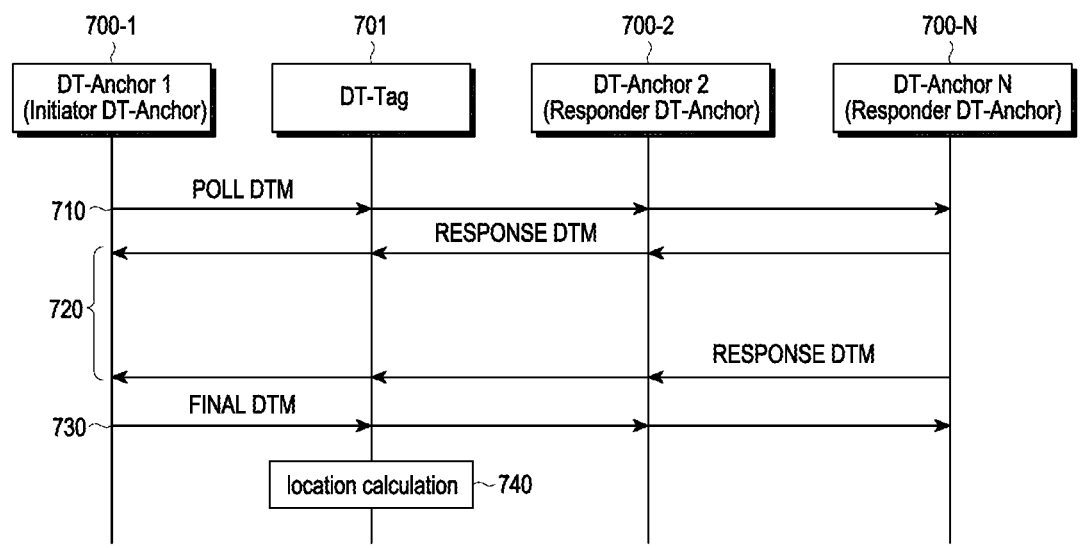
FIG. 7A illustrates operations of a DL-TDoA procedure for one-way ranging (OWR) according to an embodiment.

FIG. 7A illustrates operations of a DL-TDoA procedure for OWR according to an embodiment.

Referring to FIG. 7A, in step 710, a DT anchor 1 700-1, which is an initiator DT anchor, initiates a DT procedure by transmitting a poll message (poll DTM). The DT anchor 1 700-1 may transmit the poll DTM in the first ranging slot (i.e., slot index 0) in a corresponding ranging round.

In step 720, DT anchor 2 to DT anchor N 700-2, . . . , 700-N, which are responder DT anchors, transmit response messages (responder DTMs). For example, the responder DT anchor may identify whether a response message should be transmitted and/or a ranging slot used for transmitting the response message, based on scheduling information included in the poll message. The response message may include information about a first response time P. Here, the first response time may be the time required for the corresponding responder DT anchor to receive the initiation message and transmit a response message corresponding to the initiation message.

In step 730, the DT anchor 1 (700-1) ends the DT procedure by transmitting an end message (i.e., a final DTM). The end message may include information about a second response time y. Here, the second response time may be the time required for the initiator DT anchor to receive the response message and transmit the end message.

As illustrated in FIG. 7A, the DT tag 701 may receive (or overhear) the initiation message, the response message, and the end message exchanged between DT anchors 700-1, . . . , 700-N and obtain (find out) a TDoA curve. The DT tag 701 may obtain a TDoA result by repeating the calculation process, shown in Equation 1 below, on the signals received from, e.g., three or more DT anchors.

In step 740, the DT tag 701 obtains a relative position to the DT anchor based on the TDoA result.

Equation (1) may be used to derive the difference $d_2-d_1$ between the distance between the initiator DT anchor 700-1 and the DT tag 701 and the distance between the responder DT anchor (e.g., DT anchor 2 700-2) and the DT tag 701, as calculated based on the time values measured by the DT tag 701.

$$d_2 - d_1 = \left((\alpha - \delta) \times \frac{\tau + \gamma}{\alpha + \delta} - (\beta - \gamma)\right) \times \frac{C}{2} \quad (1)$$

In Equation (1), a denotes the time difference between the time $t_1$ when the initiation message transmitted from the initiator DT anchor is received by the DT tag and the time $t_2$ when the response message transmitted from the responder DT anchor is received by the DT tag. δ denotes the time difference between the time $t_2$ when the response message transmitted from the responder DT anchor is received by the DT tag and the time $t_3$ when the end message transmitted from the initiation DT anchor is received by the DT tag. c denotes the speed at which the signal is transmitted.

Figure 7B:
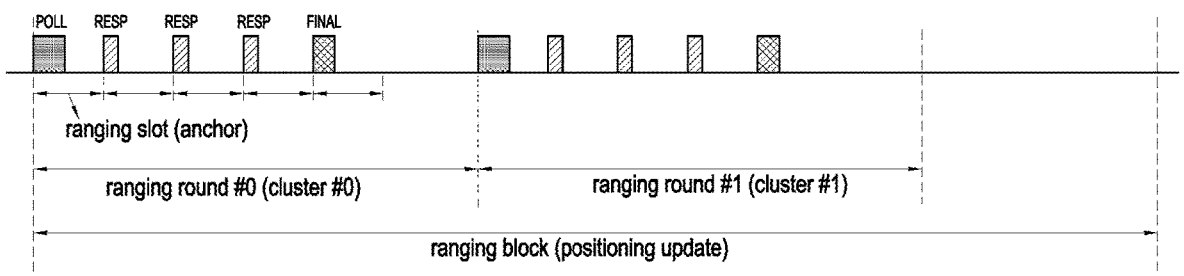
FIG. 7B illustrates message exchange operations of a DL-TDoA procedure for OWR according to an embodiment.

FIG. 7B illustrates a message exchange operation of a DL-TDoA procedure for OWR according to an embodiment.

Referring to FIG. 7B, the ranging block for DL-TDoA may include a plurality of ranging rounds.

The ranging block may include a plurality of ranging rounds allocated for each cluster. For example, when n clusters are deployed, the ranging blocks may include a first ranging round (ranging round #0) allocated for a first cluster (cluster #0), a second ranging round (ranging round #0) allocated for a second cluster (cluster #1), . . . and an n-th ranging round allocated for an nth cluster. A plurality of ranging rounds may be allocated to one cluster, or one ranging round may be allocated to a plurality of clusters.

As described above, a cluster may refer to a set of DT anchors (UWB anchors) covering a specific area. The cluster may include an initiator DT anchor and responder DT anchors responding thereto. The cluster area may be a space formed by the UWB anchors constituting the cluster. To support the positioning service for a wide area, a plurality of clusters may be configured to provide the positioning service to the UE. A cluster may be referred to as a cell. The operation of the cluster may be understood as the operation of anchor(s) belonging to the cluster.

A ranging round may include a plurality of ranging slots.

A ranging round may include a plurality of ranging slots allocated for each ranging message transmitted by the UWB anchors belonging to the cluster associated with the ranging round. For example, if one cluster includes one initiator DT anchor and three responder DT anchors, as illustrated in FIG. 7A, the ranging round for the first cluster may include a first ranging slot (e.g., ranging slot of slot index 0) allocated for transmission/reception of the poll message of the initiator DT anchor included in the first cluster, a second ranging slot allocated for transmission/reception of the response message of the first responder DT anchor, a third ranging slot allocated for transmission/reception of the response message of the second responder DT anchor, a fourth ranging slot allocated for transmission/reception of the response message of the third responder DT anchor, and a fifth ranging slot allocated for transmission/reception of the final message of the initiator DT anchor. A period other than the duration during which an associated ranging message is transmitted in the corresponding ranging slot may be a sleep period.

Ranging slots may be allocated to the ranging round for each cluster.

Through the ranging block structure as illustrated in FIG. 7B, each cluster may exchange its own ranging messages (e.g., a poll/response/final message) once in a ranging block, and the DT tag (UE) may receive these ranging messages and calculate its location. Such an operation may be repeated for each ranging block. Thus, the location of the UE may be updated in the period of the ranging block in the corresponding cluster. Accordingly, in FIG. 7B, the ranging block may correspond to a period for positioning update.

Figure 8:
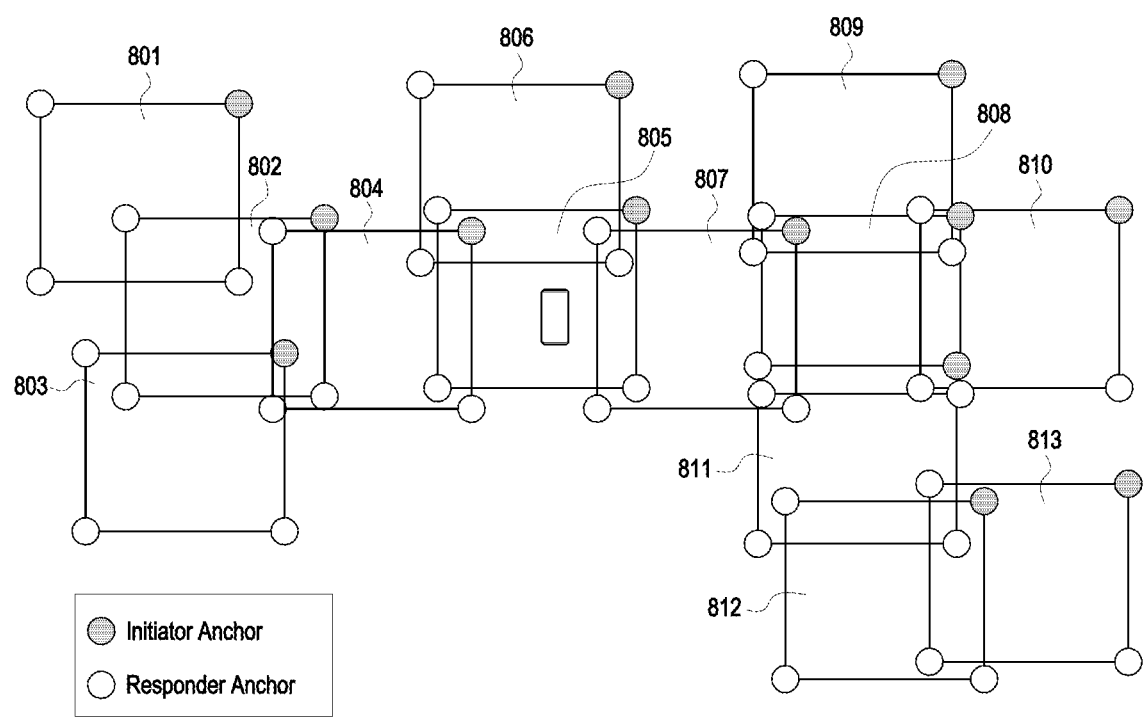
FIG. 8 illustrates a cluster deployment according to an embodiment.

FIG. 8 illustrates a cluster deployment according to an embodiment.

Referring to FIG. 8, 13 clusters 801, 802, . . . , 813 are deployed in the corresponding area, and each cluster includes one initiator anchor and three responder anchors. However, the disclosure is not limited thereto, and the number of clusters may vary, and the number of anchors included in each cluster may also vary.

An area defined by one cluster may overlap an area defined by other neighboring cluster(s). For example, the area covered by the second cluster 802 may over the area covered by the first cluster 801, the area covered by the third cluster 803, and the area covered by the fourth cluster 804. However, this is merely an example, and the clusters may be deployed so that the area defined by one cluster does not overlap the area defined by another neighboring cluster according to an embodiment.

When using a ranging block structure as illustrated in FIG. 6, each cluster may exchange its own ranging messages once in its own ranging round in the ranging block, and the UE may overhear these ranging messages to calculate its location.

One UWB anchor may belong to a plurality of adjacent clusters and, in each cluster, operate as either an initiator UWB anchor or a responder UWB anchor.

Hereinafter, various embodiments for spatial reuse of time resources (e.g., ranging rounds) in the DL-TDoA system are described. For example, described below are various methods for determining a reference time (start time) of time synchronization, methods for configuring a multi-cluster chain for time synchronization, and methods for avoiding interference/collision due to, e.g., an error in time synchronization.

FIG. 9 illustrates a cluster arrangement structure for spatial reuse of time resources according to an embodiment.

Referring to FIG. 9, for convenience of description, a single ranging block includes 8 active ranging rounds. However, the disclosure is not limited thereto. For example, the number of active ranging rounds for a single ranging block may be variously determined within the total number of ranging rounds included in a single ranging block according to settings.

As another example, the number of active ranging rounds for the ranging block may correspond to the number of spatial reuse factors.

For spatial reuse of time resources, a plurality of clusters may form one group (cluster group). As illustrated in FIG. 9, eight clusters corresponding to the number of active ranging rounds (the number of spatial reuse factors) may form one single group. For example, cluster #0 to cluster #7 may form a first cluster group (group #0), and cluster #8 to cluster #15 form a second cluster group (group #1).

Clusters having adjacent numbers (indexes) may be positioned adjacent to each other. For example, as shown, cluster #7 may be adjacent to cluster #6 and cluster #8, and cluster #0 may be adjacent to cluster #1 and cluster #15.

Clusters in each group may be allocated separate ranging rounds. For example, as shown, clusters #0 to #7 in the first cluster group (group #0) may be sequentially allocated from ranging round #0 to ranging round #7, respectively. Clusters #8 to #15 in the second cluster group (group #1) may be sequentially allocated from ranging round #0 to ranging round #7, respectively.

Through such cluster deployment and ranging round allocation, the same ranging round (time resource) may be used by a plurality of clusters belonging to different groups. For example, as shown, ranging round #0 may be used by cluster #0 of the first cluster group (group #0) and cluster #8 of the second cluster group (group #1). Thus, spatial reuse of time resources is possible.

FIG. 10 illustrates interference and collision in a cluster arrangement structure for spatial reuse of time resources according to an embodiment.

Referring to FIG. 10, the same cluster deployment and ranging round allocation scheme as in FIG. 9 are used. For example, similar to FIG. 9, in FIG. 10, clusters #0 to #7 may form a first cluster group (group #0), and cluster #8 to cluster #15 form a second cluster group (group #1). Clusters #0 to #7 in the first cluster group may be sequentially allocated from ranging round #0 to ranging round #7, respectively.

Clusters #8 to #15 in the second cluster group may be sequentially allocated from ranging round #0 to ranging round #7, respectively.

In this case, since the same time resource (e.g., ranging round) is used by a plurality of clusters (inter-group clusters) belonging to different groups, interference and collision may occur due to errors in time synchronization within and between groups. For example, interference/collision may occur due to errors in time synchronization between clusters #2, #3, and #4 of group #1 and clusters #12, #11, and #10 of group #2 using adjacent ranging rounds #2, #3, and #4 together. Therefore, the following methods are provided to address such issues.

Figure 11:
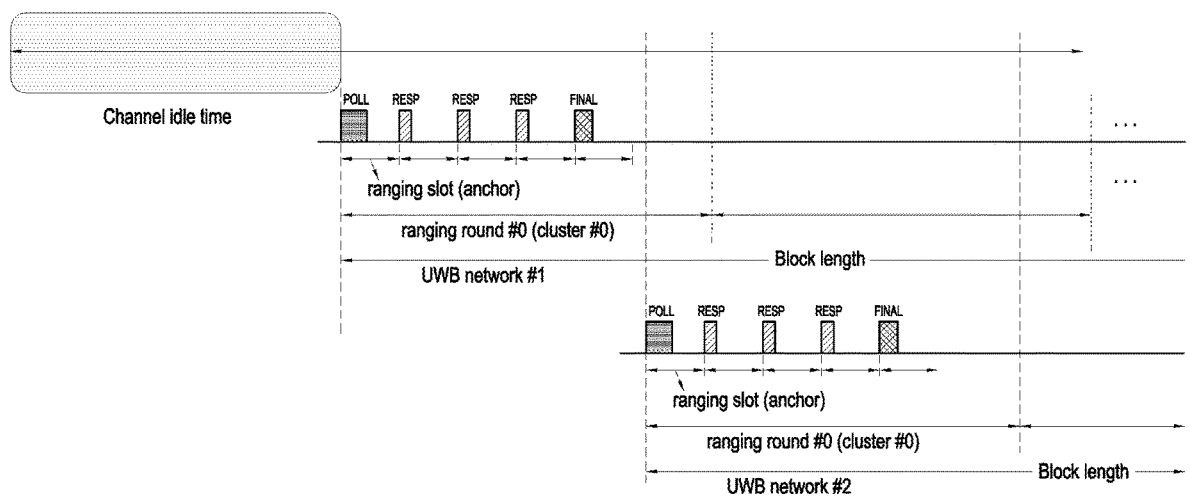
FIG. 11 illustrates a method for identifying a channel idle time to determine a reference time for time synchronization according to an embodiment.
Figure 12:
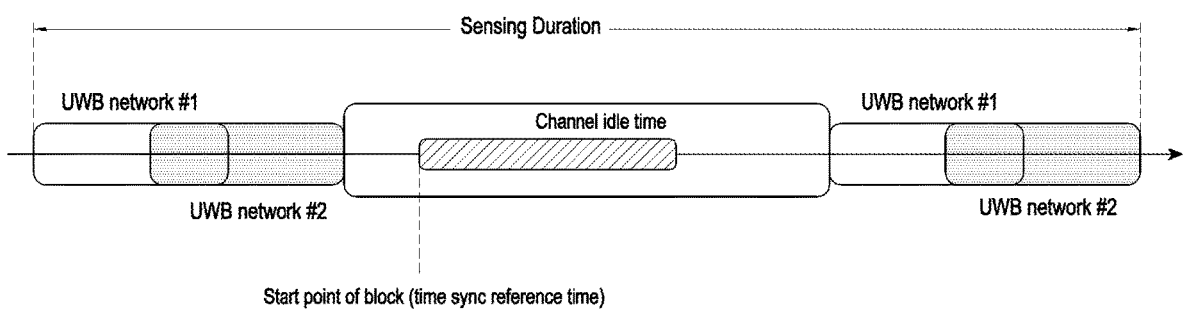
FIG. 12 illustrates a method for determining a reference time for time synchronization in a channel idle time according to an embodiment.

(1) A method for determining a reference time for time synchronization based on listen-before-talk (LBT)(e.g., FIGS. 11 to 13)

Figure 15:
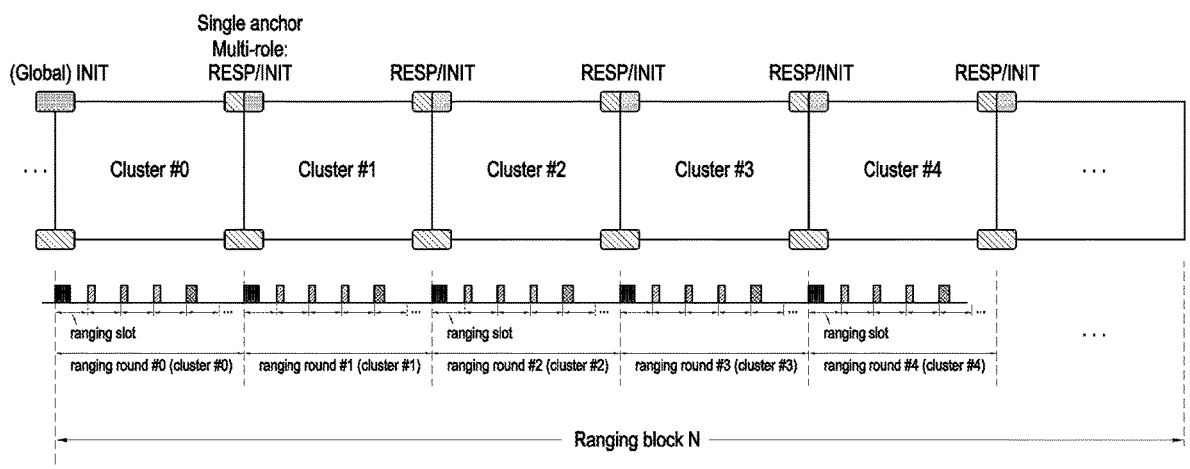
FIG. 15 illustrates a method for configuring a multi-cluster chain for time synchronization according to an embodiment.
Figure 16:
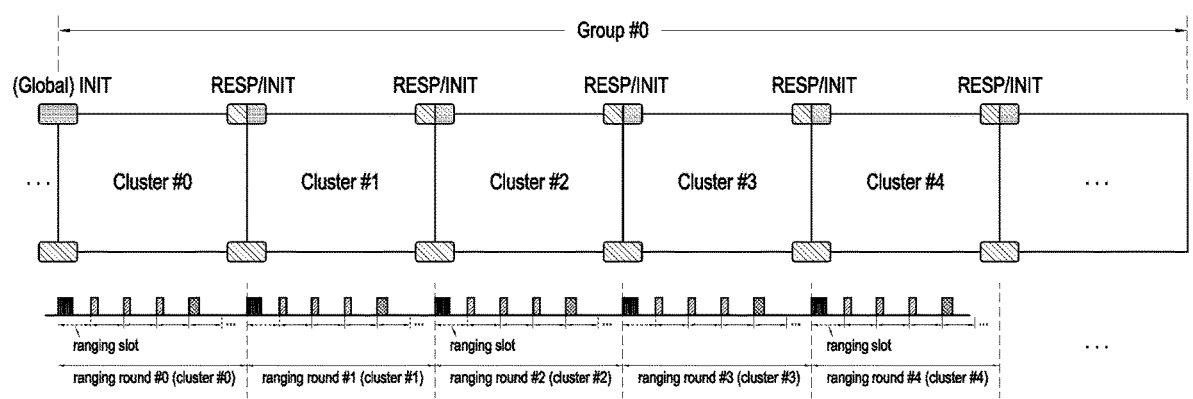
FIG. 16 illustrates an intra-group/inter-group time synchronization method based on a multi-cluster chain configuration for time synchronization according to an embodiment.

(2) A cluster configuration scheme for intra-group or inter-group time synchronization (e.g., FIGS. 14 to 16)

(3) An offset setting method for avoiding interference/collision caused by time synchronization errors (e.g., FIGS. 17 to 19)

FIG. 11 illustrates a method for identifying a channel idle time to determine a reference time for time synchronization according to an embodiment. FIG. 12 illustrates a method for determining a reference time for time synchronization in a channel idle time according to an embodiment. FIG. 13 illustrates a UWB message used to determine a reference time for time synchronization according to an embodiment.

A determination of the reference time may be performed by one or more anchors (e.g., initiator anchors) of the UWB network. For example, an initiator anchor (global initiator) operating as a global controller may determine a reference time for time synchronization. Hereinafter, for convenience of description, it is described that the global initiator determines the reference time. The global initiator may be referred to as a global initiator anchor or a controlling initiator anchor.

(1) Sensing Operation

First, the global initiator may perform channel assessment through a sensing operation.

Referring to FIG. 12, the global initiator may continuously perform a sensing operation for a preset sensing duration. The sensing operation may include an energy detection operation for channel assessment of another network (UWB network) and/or a signal detection operation for channel assessment of its own network (UWB network).

The signal detection operation may include an operation for detecting a message (e.g., the UWB message of FIG. 13) including channel state related information.

(2) Identification of Channel Idle Time (Duration)

The global initiator may identify the channel idle time through channel assessment based on the sensing operation. Here, the channel idle time may be a time when the corresponding channel (UWB channel) is not occupied by another UWB network.

Referring to FIG. 11, the global initiator may identify the presence or interference of other UWB networks (e.g., the first UWB network and the second UWB network) through the sensing operation (e.g., an energy detection operation) to identify the channel state and, based thereupon, identify the channel idle time. The other UWB networks (UWB network #1 and UWB network #2) may be UWB networks for DL-TDoA, but are not limited thereto.

As another example, the global initiator may obtain information related to the channel state through the sensing operation (e.g., a signal detection operation) and, based thereupon, identify the channel idle time.

(3) Determination of Time Synchronization Reference Time

Referring again to FIG. 12, the global initiator may determine a reference time for time synchronization within the channel idle time. For example, the global initiator may identify channel occupancy by its own network through the sensing operation (e.g., signal detection operation) and, based thereupon, determine a reference time within the channel idle time. As described above, the signal detection operation may include an operation for detecting a message (e.g., the UWB message of FIG. 13) including channel state related information. In this case, the global initiator may determine the reference time within the channel idle time based on channel state-related information included in the message.

The reference time may correspond to the start time of the ranging block of the corresponding UWB network. For example, the reference time may be the start time of the ranging block for the UWB network to which the global initiator belongs.

(3-1) Determination of Time Synchronization Reference Time Using the UWB Message of FIG. 13

Referring to FIG. 13, the UWB message includes a vendor organizational unique ID (OUI) field, a UWB message ID field, a number-of-ranging rounds field (# ranging round), and a busy ranging round bitmap field.

The vendor OUI field may include a unique value of the vendor defining a message to ensure the uniqueness of the defined messages based on the IEEE standard.

The UWB message ID field may indicate which message the corresponding message (or the payload IE of the corresponding message) is.

The number-of-ranging rounds field (# ranging round) may indicate the total number of ranging rounds of the DL-TDoA infrastructure (current DL-TDOA infrastructure) to which the anchor (e.g., initiator anchor) sending the corresponding message belongs. For example, when the ranging block for the current DL-TDoA infrastructure includes 20 ranging rounds, and each cluster selects one of the 20 ranging rounds and operates, the number-of-ranging rounds field may be set to 20.

The busy ranging round bitmap field may indicate states (e.g., channel states) of the number of ranging rounds indicated by the number-of-ranging rounds field. In the disclosure, the busy ranging round bitmap field may also be referred to as a busy round bitmap field.

The UWB message of FIG. 13 may be included and transmitted in the poll message.

First Embodiment of the Busy Ranging Round Bitmap Field

Referring again to FIG. 13, the busy ranging round bitmap field may include the number of bits indicated by the number-of-ranging rounds field. For example, the busy ranging round bitmap field may have a format of a 32-bit bitmap. In this case, each bit may indicate whether the ranging round corresponding to the corresponding bit is busy or not. For example, the bit marked as 1 may indicate that the ranging round corresponding to the corresponding bit is busy, and the bit marked as 0 may indicate that the ranging round corresponding to the corresponding bit is not busy (idle). The busy ranging round bitmap field set to "1010110000" may indicate that the 1st, 3rd, 5th, and 6th ranging rounds among the 10 ranging rounds are busy, and the remaining ranging rounds are not busy.

Second Embodiment of the Busy Ranging Round Bitmap Field

The busy ranging round bitmap field may indicate the number of byte lists indicated by the number-of-ranging rounds field. For example, the busy ranging round bitmap field may have a format of a 32-bit byte list. In this case, each byte may express the busy ratio of the ranging round corresponding to the corresponding byte as a value between 0 and 255. As such, in the second embodiment, as compared to the first embodiment, the channel state of the corresponding round may be subdivided and expressed.

<Generation/Transmission of the Busy Ranging Round Bitmap Field and Determination of a Reference Time for Time Synchronization Based on the Busy Ranging Round Bitmap Field>

The busy ranging round bitmap field (or a UWB message including the busy ranging round bitmap field) may be generated and transmitted by the initiator anchor. For example, at least one initiator anchor belonging to the current DL-TDoA infrastructure may generate and transmit a busy ranging round bitmap field (or a UWB message including the busy ranging round bitmap field).

The initiator anchor may continuously sense the channel and generate a busy ranging round bitmap field (or a UWB message including the busy ranging round bitmap field).

The initiator anchor may transmit a busy ranging round bitmap field (or a UWB message including the busy ranging round bitmap field) using a poll message (the poll DTM). For example, the initiator anchor may include and transmit a busy ranging round bitmap field (or a UWB message including the busy ranging round bitmap field) in the poll message.

The initiator anchor (global initiator) controlling spatial reuse may receive a UWB message (or the poll message) transmitted from initiator anchor(s) belonging to the same UWB network and, based on the busy ranging round bitmap field included in the UWB message, determine a reference time for time synchronization within, e.g., channel idle time.

The controlling initiator anchor may determine that the start time of the longest time duration among continuously available time durations is the reference time for time synchronization, based on the value of the busy ranging round bitmap field received from at least one initiator anchor. Here, the available time duration may be a time duration corresponding to the ranging round that is not in a busy state. The available time duration may correspond to the channel idle time.

For example, when the busy ranging round bitmap field received from the first initiator anchor is '1010110000', the value of the busy ranging round bitmap field received from the second initiator anchor is '1101100000', and the value of the busy ranging round bitmap field received from the third initiator anchor is '0110110000', the controlling initiator anchor may determine that the start time (start time of the seventh ranging round) of the time duration from the seventh ranging round to the tenth ranging round which is a time duration continuously available is the reference time.

FIG. 14 illustrates scheduling information used for scheduling a UWB anchor for time synchronization according to an embodiment.

Referring to FIG. 14, scheduling information (scheduling configuration information) may be used for scheduling the UWB anchor belonging to the same UWB network (or the same DL-TDoA infrastructure). The clusters belonging to the DL-TDoA infrastructure may include multiple anchors. Each cluster may have, e.g., the deployment structure illustrated in FIG. 9.

<Scheduling Conditions>

UWB anchor scheduling should meet the following scheduling conditions.

There should be only one initiator anchor in each cluster.

Each anchor should play only one role (e.g., as an initiator or responder) within a specific ranging round. However, anchors may play different roles in different ranging rounds. (In other words, it is possible to set multi-role anchors, and through this condition (feature), multi-cluster chains are possible)

The responder anchor should transmit a response message according to the scheduling information included in the poll message after receiving the poll message from the initiator anchor (In this case, a multi-role anchor should operate as a responder anchor first)

The anchor of the first cluster (e.g., the cluster having the lowest cluster index in the cluster deployment structure (e.g., cluster #0 in FIG. 9)) acts as a global initiator. (In this case, operations are performed sequentially in order from the cluster to which the global initiator belongs to the adjacent clusters).

A cluster configuration that meets the scheduling conditions may be referred to as a multi-cluster chain configuration.

<Embodiment of Scheduling Information According to the Scheduling Conditions>

Referring to FIG. 14, scheduling information may include time information (time) and role information (role) for at least one anchor.

The scheduling information may include time information and role information for each anchor belonging to a specific cluster. Alternatively, the scheduling information may include time information and role information for each of the anchors belonging to all the clusters belonging to the DL-TDoA infrastructure.

As illustrated in FIG. 14, scheduling information may include list elements for each anchor. Each list element may include anchor index information, time information, and role information for the corresponding anchor.

The anchor index information may indicate the index of the corresponding anchor.

The time information may indicate the index of the ranging round in which the anchor identified by the anchor index information operates.

The role information may indicate the anchor's role (e.g., as the initiator or responder) identified by the anchor index information.

The time information and role information may also be expressed in one field. In this case, the corresponding field may be set to the ranging round index for the anchor identified by the anchor index information and the value indicating the anchor role.

The scheduling information illustrated in FIG. 14 may provide the following information.

Anchors #0, #1, #2, and #3 corresponding to anchor indexes #0, #1, #2, and #3 operate in ranging round #0 corresponding to round index #0.

In ranging round #0, anchor #0 acts as an initiator, and anchors #1 to #3 act as responders.

Anchor #3 acts as an initiator in ranging round #1 (the next ranging round) corresponding to round index #1. In other words, anchor #3 may play multiple roles.

<Embodiment of Transmission of Scheduling Information>

In accordance with an embodiment of the disclosure, scheduling information may be transmitted by the global initiator. For example, the global initiator may transmit scheduling information for the entire cluster through the poll message. Scheduling information may also be included in the poll message (or payload IE of the poll message). In this case, all anchors of the entire cluster may identify their operation times (ranging rounds) and roles based on the scheduling information.

In another embodiment, scheduling information may be transmitted by the initiator anchor of the corresponding cluster. For example, the initiator anchor may transmit the scheduling information for the corresponding cluster using the poll message. Scheduling information may be included in the poll message (or payload IE of the poll message). In this case, the anchors of the corresponding cluster may identify their operation times (ranging rounds) and roles based on the scheduling information.

The poll message may include information for time synchronization between anchors in the cluster. For example, when a clock frequency offset (CFO) based initiator scheme is applied, the poll message may include CFO information (field). The CFO information may indicate a CFO with respect to the initiator. For example, the CFO information may be used to indicate a speed difference between the clock (reference clock) of the initiator and the clock of the responder anchor.

An operation time and role of each anchor of the DL-TDoA infrastructure may be initially set by the operator of the DL-TDoA infrastructure. In this case, the above-described scheduling information may be generated/transmitted by the global initiator (or initiator anchor) when it is necessary to reset the operation time and role of each anchor to a setting other than the initial setting.

FIG. 15 illustrates a method for configuring a multi-cluster chain for time synchronization according to an embodiment. For example, FIG. 15 illustrates a multi-cluster chain configuration for time synchronization.

Referring to FIG. 15, ranging block N includes a plurality of ranging rounds. Among the plurality of ranging rounds, ranging round #0 may be allocated for cluster #0. ranging round #1 for cluster #1, ranging round #2 for cluster #2, ranging round #3 for cluster #3, and ranging round #4 for cluster #4.

The initiator of cluster #0 associated with the first ranging round (ranging round #0) of ranging block N may transmit scheduling information (e.g., the scheduling information of FIG. 14). The initiator of cluster #0 may act as a global initiator.

Each anchor receiving the scheduling information may identify its operation time and role based on the scheduling information. Thus, the anchors may perform message exchange operations (e.g., the operation of exchanging the poll message, response message, and/or final message) for DL-TDoA according to their respective roles in the corresponding ranging round.

Operations of anchors in each cluster are described below.

<Operations of Anchors in Cluster #0>

The initiator of cluster #0 may transmit the poll message including scheduling information. As illustrated in FIG. 15, the initiator of cluster #0 may transmit the poll message in the first ranging slot (i.e., slot index 0) in ranging round #0.

The remaining anchors in cluster #0 may receive the poll message from the initiator and identify that their roles are responders based on the scheduling information included in the poll message. Further, one anchor of cluster #0 may identify that it plays multiple roles.

Each responder may transmit a response message corresponding to the poll message to the initiator in the ranging slot allocated for itself. Information about the ranging slot allocated to each responder may be included in the poll message. For example, information about the ranging slot allocated to each responder may be included in the ranging device management list field (e.g., a ranging device management list as illustrated in FIG. 19A) included in the poll message.

The initiator may transmit a final message corresponding to the response message from the responders.

One of the responders of cluster #0 may play multiple roles. For example, one of the responders in cluster #0 acts as a responder in the current ranging round (ranging round #0), but may act as an initiator in the next ranging round (ranging round #1). Ranging (DL-TDoA) in the next ranging round may be initiated by the responder playing the multiple roles.

<Operations of Anchors in Cluster #1>

The initiator of cluster #1 may send the poll message. As illustrated in FIG. 15, the initiator of cluster #1 may transmit the poll message in the first ranging slot (i.e., slot index 0) in ranging round #1.

As described above, the initiator of cluster #1 is a multi-role anchor and plays a role as a responder in ranging round #0 (previous ranging round) of cluster #0. The poll message may include scheduling information.

The remaining anchors (responders) of cluster #1 may receive the poll message from the initiator and transmit a response message corresponding to the poll message to the initiator in the ranging slot allocated thereto. Information about the ranging slot allocated to each responder may be included in the poll message.

The initiator may transmit a final message corresponding to the response message from the responders.

One of the responders of cluster #1 may play multiple roles. For example, one of the responders in cluster #1 acts as a responder in the current ranging round (ranging round #1), but may act as an initiator in the next ranging round (ranging round #2). Ranging (DL-TDoA) in the next ranging round may be initiated by the responder playing the multiple roles.

<Operations in the Remaining Clusters>

In the remaining clusters, similar to the operation in cluster #1, each anchor may perform a message exchange operation for DL-TDoA ranging according to its operation time and role indicated by scheduling information.

The multi-cluster configuration of FIG. 15 corresponds to a multi-cluster chain configuration. Thus, one anchor in a cluster is configured to perform multiple roles. Through the multi-cluster chain configuration, intra-cluster time synchronization and inter-cluster time synchronization are possible.

<Intra-Cluster Synchronization>

Intra-cluster synchronization may be time synchronization between anchors in one cluster. Intra-cluster synchronization may include an operation for synchronizing the responders belonging to one cluster to the clock of the initiator belonging to the same cluster. For example, when a CFO-based time synchronization scheme is applied, the responders may obtain (or calculate) a CFO based on the initiator's poll message and perform time synchronization between the initiator and responders using the CFO. The poll message may include CFO information.

<Inter-Cluster Synchronization>

Inter-cluster synchronization may be time synchronization between adjacent clusters. Inter-cluster synchronization may include an operation for maintaining the same ranging block structure between adjacent clusters. When the multi-cluster configuration is the same as the multi-cluster chain configuration of FIG. 15, the anchor operating as a responder of the current cluster operates as the initiator of the next cluster due to the chain configuration of the clusters, so that the above-described intra-cluster time synchronization method may be extended to the inter-cluster time synchronization method. In other words, inter-cluster time synchronization may be performed by extending the intra-cluster time synchronization method based on the poll message without separate message exchange for time synchronization between the initiators of the clusters.

FIG. 16 illustrates an intra-group/inter-group time synchronization method based on a multi-cluster chain configuration for time synchronization according to an embodiment of the disclosure.

Referring to FIG. 16, clusters #0 to #4 belong to a single group (group #0).

One anchor belonging to each cluster of group #0 may play multiple roles, such as acting as a responder in the current ranging round and acting as an initiator in the next ranging round. Through this anchor (first multi-role anchor), the clusters in the group may have a chain structure.

Although not illustrated, one anchor of the cluster of group #0 (e.g., cluster #7 of FIG. 9) may play as a responder in the current ranging round corresponding to the corresponding cluster of group #0 and may act as an initiator in the next ranging round corresponding to the cluster (e.g., cluster #8 of FIG. 9) of group #1 adjacent to group #0. That is, through the anchor (the second multi-role anchor), adjacent clusters between groups may have a chain structure.

Due to such a chain structure of intra-group and inter-group clusters, the intra-cluster time synchronization method of FIG. 15 may be extended to the following intra-group time synchronization method and inter-group time synchronization method.

<Intra-Group Synchronization>

Intra-group synchronization may be time synchronization between clusters within a group. Intra-group synchronization may include an operation for maintaining the same ranging block structure between adjacent clusters. When the multi-cluster configuration is a multi-cluster chain configuration as illustrated in FIGS. 15 and 16, the anchor operating as a responder of the current cluster in the group operates as the initiator of the next cluster due to the chain configuration of the clusters in the group, so that the inter-cluster time synchronization method described above in connection with FIG. 15 may be extended to the intra-group time synchronization method.

Inter-cluster time synchronization may be performed by extending the inter-cluster time synchronization method based on the poll message without separate message exchange for time synchronization between the initiators of the clusters in the group.

<Inter-Group Synchronization>

Inter-group synchronization may be time synchronization between adjacent groups. Inter-group synchronization may include an operation for maintaining the same ranging block structure between adjacent groups. When the multi-cluster configuration is a multi-cluster chain configuration as illustrated in FIGS. 15 and 16, the anchor operating as a responder of the current cluster between the groups operates as the initiator of the next cluster due to the chain configuration of the clusters between the groups, so that the above-described inter-cluster time synchronization method may be extended to the inter-group time synchronization method.

Inter-cluster time synchronization may be performed by extending the inter-cluster time synchronization method based on the poll message without separate message exchange for time synchronization between the initiators of the group clusters.

FIG. 17A illustrates a method for applying a slot level transmission offset according to an embodiment.

Referring to FIG. 17A, for convenience of description, the number of clusters belonging to the DL-TDoA infrastructure is 15, the number of active ranging rounds (the number of spatial reuse factors) included in one ranging block is 5, and the cluster configuration is a multi-cluster chain configuration. In FIG. 17A, it is also assumed that the five active ranging rounds are ranging round #0 to ranging round #4.

In this case, one ranging round may be used by a plurality of clusters. For example, as illustrated in FIG. 17A, ranging round #0 may be used by cluster #0 of cluster group #0, cluster #5 of cluster group #1, and cluster #10 of cluster group #2.

Referring to FIG. 17A, operations of cluster #5 of cluster group #1 and cluster #10 of cluster group #2 are described below as an example.

<Operation of Cluster #5 Id Cluster Group #1>

As illustrated, cluster #5 may operate in ranging round #0.

The initiator (initiator anchor) of cluster #5 may transmit a first poll message in ranging round #0. For example, the initiator may transmit the first poll message in the second slot of ranging round #0. The anchor corresponding to the initiator of cluster #5 acted as a responder (responder anchor) of cluster #4 in ranging round #4, which is the preceding ranging round of ranging round #0.

The first poll message may include ranging slot allocation information (e.g., a ranging device management list as illustrated in FIG. 19A) for responders (e.g., three responders) belonging to cluster #5. The ranging slot allocation information may include the ranging slot index for each responder belonging to the corresponding cluster. The ranging slot index may indicate the index of the ranging slot used by the corresponding responder to transmit a response message.

The initiator may randomly set the value of the ranging slot index for each responder. For example, the initiator may allocate a 5th slot, a 7th slot, and a 9th slot for each responder. Through such random slot allocation, interference/collision between clusters of different groups (e.g., clusters #5 and #10) using the same ranging round may be avoided.

Each responder may identify its own ranging slot index included in the ranging slot allocation information and transmit its response message to the initiator in the ranging slot with the corresponding ranging slot index.

The initiator may receive response messages from the responders and transmit final messages. For example, the initiator may transmit the final message in the ranging slot very next to the ranging slot where the last response message was received.

<Operation of Duster #10 in Cluster Group #2>

As illustrated, like cluster #5, cluster #10 may operate in ranging round #0.

The initiator (initiator anchor) of cluster #10 may transmit a second poll message in ranging round #0. For example, the initiator may transmit the second poll message in the first slot of ranging round #0. As such, the initiator of cluster #10 may avoid interference/collision by transmitting the poll message in a different ranging slot than that of the initiator of cluster #5. The anchor corresponding to the initiator of cluster #10 acted as a responder (responder anchor) of cluster #9 in ranging round #4, which is the preceding ranging round of ranging round #0.

The second poll message may include ranging slot allocation information (e.g., a ranging device management list as illustrated in FIG. 19A) for responders (e.g., three responders) belonging to cluster #10. The ranging slot allocation information may include the ranging slot index for each responder belonging to the corresponding cluster. The ranging slot index may indicate the index of the ranging slot used by the corresponding responder to transmit a response message.

The initiator may randomly set the value of the ranging slot index for each responder. For example, the initiator may allocate a 3rd slot, a 4th slot, and a 6th slot for each responder. Through such random slot allocation, interference/collision between clusters of different groups (e.g., clusters #5 and #10) using the same ranging round may be avoided.

Each responder may identify its own ranging slot index included in the ranging slot allocation information and transmit its response message to the initiator in the ranging slot with the corresponding ranging slot index.

The initiator may receive response messages from the responders and transmit final messages. For example, the initiator may transmit the final message in the ranging slot, which is two slots after the ranging slot where the last response message was received. As such, the initiator of cluster #10 may avoid interference/collision by transmitting the final message in a different ranging slot than that of the initiator of cluster #5.

In FIG. 17A, the initiator randomly allocates ranging slot indexes to the responders and transmits the ranging slot index information, as slot level offsets, to the responders through the poll message. Thus, interference/collision between the clusters of different groups using the same ranging round may be reduced. Since scheduling of the responders according to the embodiment of FIG. 17A is performed in units of slots, the offset transmission scheme of FIG. 17A may be referred to as a slot-level offset transmission scheme.

FIG. 17B illustrates a method for applying a subslot level transmission offset according to an embodiment.

Referring to FIG. 17B, for convenience of description, like in FIG. 17A, the number of clusters belonging to the DL-TDoA infrastructure is 15, the number of active ranging rounds (the number of spatial reuse factors) included in one ranging block is 5, and the cluster configuration is a multi-cluster chain configuration. In FIG. 17B, it is also assumed that the five active ranging rounds are ranging round #0 to ranging round #4.

One ranging round may be used by a plurality of clusters. For example, as illustrated in FIG. 17B, ranging round #0 may be used by cluster #0 of cluster group #0, cluster #5 of cluster group #1, and cluster #10 of cluster group #2.

Further, in FIG. 17B, unlike in FIG. 17A, it is assumed that one ranging slot is divided into 4 subslots.

Referring to FIG. 17B, operations of cluster #5 of cluster group #1 and cluster #10 of cluster group #2 are described below as an example.

<Operation of Cluster #5 in Cluster Group #1>

As illustrated, cluster #5 may operate in ranging round #0.

The initiator (initiator anchor) of cluster #5 may transmit a first poll message in ranging round #0. For example, the initiator may transmit the first poll message in the fourth subslot of the first slot of ranging round #0. The anchor corresponding to the initiator of cluster #5 acted as a responder (responder anchor) of cluster #4 in ranging round #4, which is the preceding ranging round of ranging round #0.

The first poll message may include ranging slot allocation information (e.g., a ranging device management list as illustrated FIG. 19A) for responders (e.g., three responders) belonging to cluster #5. The ranging slot allocation information may include the ranging slot index for each responder belonging to the corresponding cluster. The ranging slot index may indicate the index of the ranging slot used by the corresponding responder to transmit a response message.

The first poll message may include subslot level offset-related information. The subslot level offset-related information may include information related to the number of subslots and/or subslot offset information for the responders.

The subslot offset information may include a bitmap providing subslot offsets that apply to the responders. For example, the subslot offset information may include the number of bits corresponding to the number of responders. In this case, each bit may indicate the subslot offset for the corresponding responder. For example, subslot offset information set to '121' may indicate that the subslot offset of responder #1 is 1, indicate that the subslot offset of responder #2 is 2, and indicate that the subslot offset of responder #3 is 1. The value of the subslot offset for each responder may be set randomly. Through such random subslot offset allocation, interference/collision between clusters of different groups (e.g., clusters #5 and #10) using the same ranging round may be avoided.

Alternatively, the subslot offset information may include a code number indicating one of the previously defined pseudo random subslot offset sequences. Through use of such pseudo random sequence, interference/collision between clusters of different groups (e.g., clusters #5 and #10) using the same ranging round may be avoided.

Each responder may identify its own ranging slot index based on the ranging slot allocation information and, based on the subslot level offset-related information, transmit its own response message to the initiator in the subslot corresponding to the corresponding subslot offset in the ranging slot corresponding to the corresponding ranging slot index. For example, when subslot offset information set to '121' is received, responder #1 may transmit a response message in the second subslot of the corresponding ranging slot (e.g., the second ranging slot), responder #2 may transmit a response message in the third subslot of the corresponding ranging slot (e.g., the third ranging slot), and responder #3 may transmit a response message in the second subslot of the corresponding ranging slot (e.g., the fourth ranging slot).

The initiator may receive response messages from the responders and transmit final messages. For example, the initiator may transmit the final message in the fourth subslot of the ranging slot very next to the ranging slot where the last response message was received.

<Operation of Cluster #10 in Cluster Group #2>

As illustrated, like cluster #5, cluster #10 may operate in ranging round #0.

The initiator (initiator anchor) of cluster #10 may transmit a second poll message in ranging round #0. For example, the initiator may transmit the first poll message in the first subslot of the first slot of ranging round #0. The anchor corresponding to the initiator of cluster #10 acted as a responder (responder anchor) of cluster #9 in ranging round #4, which is the preceding ranging round of ranging round #0.

The first poll message may include ranging slot allocation information (e.g., a ranging device management list as illustrated in FIG. 19A) for responders (e.g., three responders) belonging to cluster #10. The ranging slot allocation information may include the ranging slot index for each responder belonging to the corresponding cluster. The ranging slot index may indicate the index of the ranging slot used by the corresponding responder to transmit a response message.

The first poll message may include subslot level offset-related information. The subslot level offset-related information may include information related to the number of subslots and/or subslot offset information for the responders.

The subslot offset information may include a bitmap providing the subslot offset that apply to each responder. For example, the subslot offset information may include the number of bits corresponding to the number of responders. In this case, each bit may indicate the subslot offset for the corresponding responder. For example, subslot offset information set to '000' may indicate that the subslot offset of responder #1 is 0, indicate that the subslot offset of responder #2 is 0, and indicate that the subslot offset of responder #3 is 0. The value of the subslot offset for each responder may be set randomly. Through such random subslot offset allocation, interference/collision between clusters of different groups (e.g., clusters #5 and #10) using the same ranging round may be avoided.

The subslot offset information may include a code number indicating one of the previously defined pseudo random subslot offset sequences. Through use of such pseudo random sequence, interference/collision between clusters of different groups (e.g., clusters #5 and #10) using the same ranging round may be avoided.

Each responder may identify its own ranging slot index based on the ranging slot allocation information and, based on the subslot level offset-related information, transmit its own response message to the initiator in the subslot corresponding to the corresponding subslot offset in the ranging slot corresponding to the corresponding ranging slot index. For example, when subslot offset information set to '000' is received, responder #1 may transmit a response message in the first subslot of the corresponding ranging slot (e.g., the second ranging slot), responder #2 may transmit a response message in the first subslot of the corresponding ranging slot (e.g., the third ranging slot), and responder #3 may transmit a response message in the first subslot of the corresponding ranging slot (e.g., the fourth ranging slot).

The initiator may receive response messages from the responders and transmit final messages. For example, the initiator may transmit the final message in the first subslot of the ranging slot very next to the ranging slot where the last response message was received.

FIG. 18A illustrates control message information for a DL TDoA message for spatial reuse according to an embodiment. FIG. 18B illustrates a content control field (Content control) included in the control message information of FIG. 18A.

The control message information (field) may be used to support operation status/sensing of a surrounding UWB network. The control message information may include slot offset information (slot level offset-related information) and/or subslot offset information (subslot level offset-related information) for interference/collision avoidance.

The DL-TDoA message may be the poll message (the poll DTM), response message (response DTM) or final message (final DTM).

Referring to FIG. 18A, the control message information (or DL-TDoA message) includes a group ID field (Group ID), a cluster ID field (Cluster ID), a total number of spatial reuse factors field, a content control field (Control control), a ranging block duration (RBD) field, a ranging round duration (RRD) field, a ranging slot duration (RSD) field, and a ranging subslot duration (RSSD), and a ranging subslot offset (RSSO) field.

The control message information may be included in the DL-TDoA message. For example, the control message information may be included in the IE (e.g., the header IE and/or payload IE of the UWB MAC frame defined in IEEE 802.15.4z) of the DL-TDoA message. The control message information may be included in the advanced ranging control (ARC) IE of the DL-TDoA message or a separately defined payload IE.

The group ID field may indicate the ID of the cluster group (current cluster group) where the corresponding message is transmitted.

The cluster ID field may indicate the ID of the cluster (current cluster) in which the corresponding message is transmitted.

The total number of spatial reuse factors field may indicate the total number of spatial reuse factors. The total number of spatial reuse factors may correspond to the total number of active ranging rounds.

The content control field may provide control information about at least one field included in the corresponding message (or the payload IE of the corresponding message). As illustrated in FIG. 18B, the content control field may include a ranging block duration present (RBDP) field, a ranging round duration present (RRDP) field, a ranging slot duration present (RSDP) field, a ranging subslot duration present (RSSDP) field, and a ranging subslot offset present (RSSOP) field.

The RBDP field may indicate whether the RBD field is present. For example, the RBDP field may be set to a first value indicating the presence of the RBD field or a second value indicating the absence of the RBD field.

The RRDP field may indicate whether the RRD field is present. For example, the RRDP field may be set to a first value indicating the presence of the RRD field or a second value indicating the absence of the RRD field.

The RSDP field may indicate whether the RSD field is present. For example, the RSDP field may be set to a first value indicating the presence of the RSD field or a second value indicating the absence of the RSD field.

The RSSDP field may indicate whether the RSSD field is present. For example, the RSSDP field may be set to a first value indicating the presence of the RSSD field or a second value indicating the absence of the RSSD field.

The RSSOP field may indicate whether the RSSO field is present. For example, the RSSOP field may be set to a first value indicating the presence of the RSSO field or a second value indicating the absence of the RSSO field.

The RBD field may include information about the duration of the ranging block. As an embodiment, the RBD field may designate the duration of the ranging block in ranging scheduling time units (RSTUs).

The RRD field may include information about the duration of the ranging round. For example, the RRD field may designate the duration of the ranging round in units of ranging slots (e.g., the number of ranging slots in the ranging round).

The RSD field may include information about the duration of the ranging slot. The RSD field may designate the duration of the ranging slot in RSTU units.

The RSSD field may include information about the duration of the ranging subslot. The RSD field may designate the duration of the ranging subslot in RSTU units. The quantity of subslots included in one ranging slot may be identified by the RSD field and the RSSD field.

The RSSO field may include subslot offset information.

The subslot offset information may include a bitmap providing subslot offsets applied to corresponding anchors (e.g., responders in the cluster indicated by the group ID and the cluster ID). For example, the subslot offset information may include the number of bits corresponding to the number of corresponding anchors (e.g., corresponding responders). In this case, each bit may indicate the subslot offset for the corresponding anchor. For example, the subslot offset information set to '121' may indicate that the subslot offset of anchor #1 (e.g., responder #1) is 1, indicate that the subslot offset of anchor #2 (e.g., responder #2) is 2, and indicate that the subslot offset of anchor #3 (e.g., responder #3) is 1. The value of the subslot offset for each anchor may be set randomly. Through such random subslot offset allocation, interference/collision between clusters of different groups using the same ranging round may be avoided.

Alternatively, the subslot offset information may include a code number indicating one of the previously defined pseudo random subslot offset sequences. Through use of such pseudo random sequence, interference/collision between clusters of different groups using the same ranging round may be avoided.

FIG. 19A illustrates a DL TDoA message including control message information according to an embodiment. FIG. 19B illustrates a message control field (message control) included in the DL TDoA message of FIG. 19A.

For example, the control message information (field) of FIG. 19 may be the control message information (field) of FIG. 18.

The DL-TDoA message may be a poll message (the poll DTM), a response message (response DTM), or a final message (final DTM).

The fields of FIG. 19A may be included in the content field of the payload IE for the DL-TDoA message.

The DL-TDoA message may be transmitted through a UWB PHY packet (SP1 packet/SP1 frame) with a SP1 packet configuration.

Referring to FIG. 19A, the DL-TDoA message (or the payload IE content field for the DL-TDoA message) includes a vendor OUI field (Vendor OUI), a UWB message ID field (UWB Message ID), a message control field (Message Control), a block index field (Block Index), a round index field (Round Index), a transmission timestamp field (Tx Timestamp), a ranging device management (RDM) list field (RDM List), a CFO field, a response time list field (Reply Time list), and/or a control message field (Control message).

Vendor OUI: a field including a unique value of the vendor defining a message to ensure the uniqueness of the defined messages based on the IEEE standard. For example, in the case of the payload IE defined in FiRa consortium, the Vendor OUI field may include a value of 0x5A18FF.

UWB message ID: a field indicating which message the corresponding message (or the payload IE of the corresponding message) is. In FIG. 19A, the UWB message ID may be set to a first value indicating the poll DTM, a second value indicating a response DTM, or a third value indicating final DTM.

Message control: a field including information about the presence or absence of various parameters included in the corresponding message (or the payload IE of the corresponding message) and, in the case of parameters expressed in a list form, the number of elements included in the list or the length of the parameter.

Referring to FIG. 19B, the message control field includes an RDM list length field, a reply time list length field, a CFO present field, and a control message present field.

The RDM list length field may include information about the number/length of elements included in the RDM list field.

The reply time list length field may include information about the number/length of elements included in the reply time list. When the DL TDoA message is a response message, the reply time list length field is set to 1. Alternatively, when the DL TDoA message is a final message, the reply time list length field is set to the number of responder anchors for which the initiator has successfully received a response message.

The CFO present field may indicate whether the CFO field is present. For example, the CFO present field may be set to a first value indicating the presence of the CFO field or a second value indicating the absence of the CFO field.

The Control message present field may indicate whether the control message field is present. For example, the Control message present field may be set to a first value indicating the presence of the control message field or a second value indicating the absence of the control message field.

Block index: indicates an index of a ranging block (current ranging block) in which a corresponding message is transmitted.

Round index: indicates an index of a ranging round (current ranging round) in which a corresponding message is transmitted.

Tx timestamp: includes the timestamp of when the corresponding message is transmitted. The Tx timestamp may be used for operations related to downlink TDoA, such as synchronizing, correcting clock speed differences, and/or calculating TDoA.

RDM list: The RDM list may include N ranging device management list elements. Each ranging device management list element may include scheduling information for the corresponding responder anchor. For example, the ranging device management list element may include an address field indicating the address of the corresponding responder anchor and a ranging slot index field indicating the index of the ranging slot allocated to the responder anchor identified by the address field.

The ranging slot index for the responder anchor may be randomly allocated. In this case, the RDM list field may be used for the slot level offset operation.

When the DL TDoA message is a poll message, the ranging device management list field may be included in the DL TDoA message. Alternatively, when the DL TDoA message is a response message or a final message, the ranging device management list field is not included in the DL TDoA message.

CFO: indicates the CFO for an initiator anchor. The CFO value may be used for the DT-tag to calculate the precise TDoA.

Reply time list: a parameter including a list of response times of the final DTM for the response DTM.

When the initiator anchor receives a plurality of response DTMs, the reply time list field in the final message may configure the respective response times for the received response DTMs in the form of a list.

The reply time list field in the response message may include a response time for the poll message of the corresponding responder anchor.

When the DL TDoA message is a poll message, the reply time list field is not included in the DL TDoA message.

Control message: includes control message information for spatial reuse support.

The control message field may include, e.g., all or some of fields included in the control message information of FIG. 18A.

The control message field may include a group ID field, a cluster ID field, a total number of spatial reuse factors field, a content control field, an RB) field, an RRD field, an RSD field, an RSSD, and/or an RSSO field. For a description of each field, reference may be made to the description of FIG. 18A. The RSD field, RSSD field and/or RSSO field may be used for subslot level offset operations.

Figure 20A:
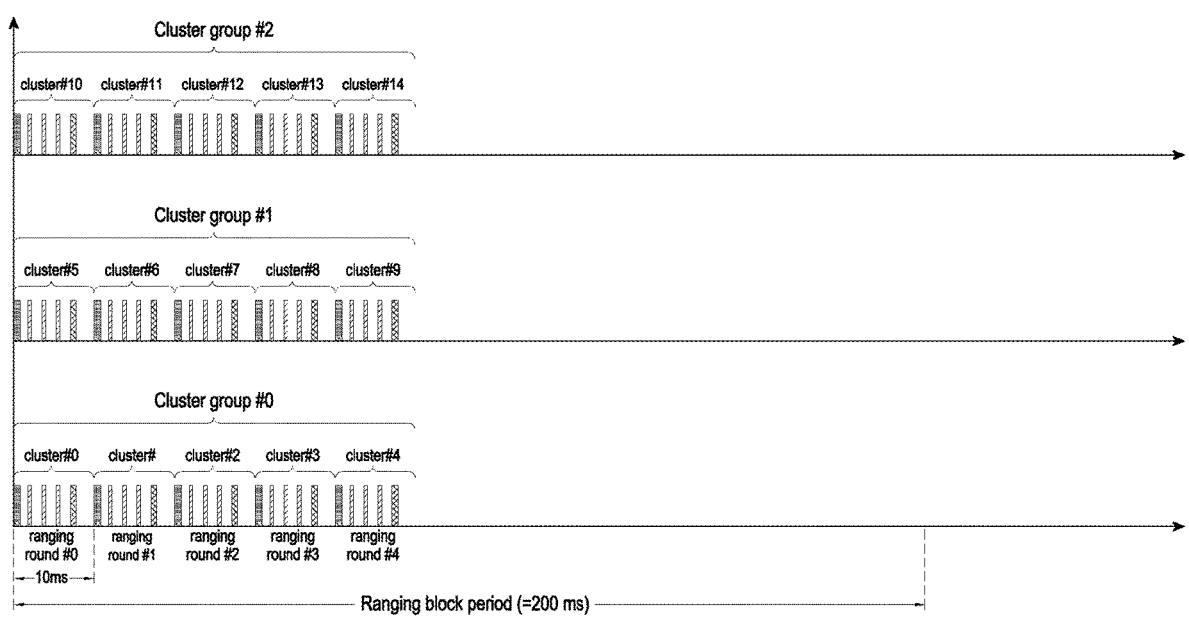
FIG. 20A illustrates operations of a cluster in an inter-group time synchronized state according to an embodiment.

FIG. 20A illustrates operations of a cluster in an intergroup time synchronized state according to an embodiment. More specifically, FIG. 20A illustrates an ideal context in which cluster groups have precisely been time-synchronized. In this ideal context, the same time structure (e.g., ranging block structure) may be maintained between cluster groups.

Referring to FIG. 20A, the start time of the ranging block of cluster group #1, the start time of the ranging block of cluster group #2, and the start time of the ranging block of cluster group #3 may be matched.

In this case, spatial reuse may be performed in such a manner as to allocate ranging rounds not to cause collision/interference between clusters transmitting ranging messages (e.g., DL TDoA messages) in the same time range.

Figure 20B:
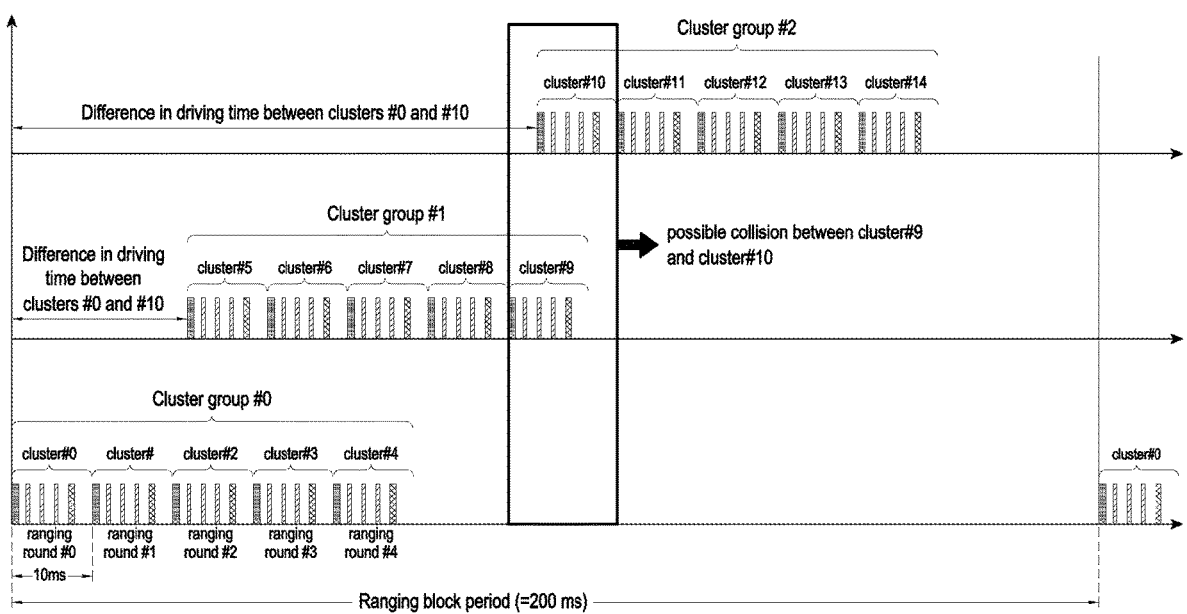
FIG. 20B illustrates operations of a cluster in an inter-group time unsynchronized state according to an embodiment.

FIG. 20B illustrates operations of a cluster in an intergroup time unsynchronized state according to an embodiment. More specifically, FIG. 20B illustrates a context in which each cluster group operates independently. In such a context, the same time structure (e.g., ranging block structure) is not maintained between cluster groups.

Referring to FIG. 20B, the start time of the ranging block of cluster group #1, the start time of the ranging block of cluster group #2, and the start time of the ranging block of cluster group #3 may not be matched.

In this case, interference between cluster groups may occur. For example, as shown, interference may occur between cluster #9 of cluster group #1 and cluster #10 of cluster group #2.

Interference between cluster groups as illustrated in FIG. 20B may occur according to, e.g., the power on time of the cluster using the first ranging round (ranging round #0) within the cluster group.

Figure 21:
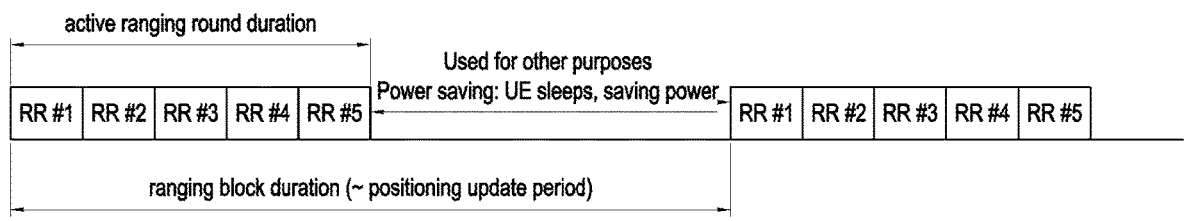
FIG. 21 illustrates a method for optimizing a spatial reuse factor according to an embodiment.

FIG. 21 illustrates a method for optimizing a spatial reuse factor according to an embodiment. More specifically, FIG. 21 illustrates optimizing the number of active ranging rounds.

Referring to FIG. 21, in the entire duration of the ranging block, some sections may be set as active ranging round durations for DL-TDoA, and the remaining sections may be set as sleep duration/inactive ranging round duration. That is, only some ranging rounds (e.g., ranging rounds #1 to #5) among all of the ranging rounds in the ranging block may be operated as active ranging rounds for DL-TDoA.

When only some ranging rounds are operated as active ranging rounds, the following advantages may be obtained.

Anchor side (anchor end): time resources (ranging rounds) used for DL-TDoA may be reduced, and the remaining time resources (ranging rounds) may be used for purposes other than DL-TDoA.

UE side (UE end): the time duration when reception should be performed for DL-TDoA is reduced, saving power. The UE operates in a sleep state during the sleep duration, reducing power consumption.

However, when the number of active ranging rounds (or active ranging round durations) is set to be too small, the distance between clusters using the same ranging round may decrease, resulting in increased interference. Therefore, the number of active ranging rounds (the number of spatial reuse factors) should be optimized considering the topographical characteristics of the service area.

Setting the number of active ranging rounds may be performed by a global initiator.

Figure 22:
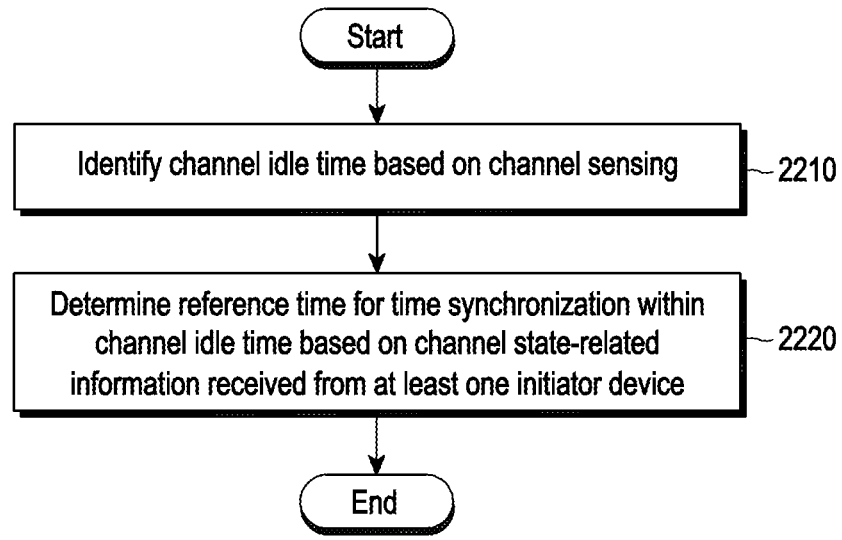
FIG. 22 is a flowchart illustrating a method by a first UWB device according to an embodiment.

FIG. 22 is a flowchart illustrating a method by a first UWB device according to an embodiment.

Referring to FIG. 22, in step 2210, the first UWB device identifies a channel idle time based on channel sensing.

In step 2220, the first UWB device determines a reference time for time synchronization within the channel idle period based on channel state-related information received from at least one initiator device.

The reference time may correspond to the start time of the ranging block for the first UWB device. The ranging block may include at least one ranging round, and each of the at least one ranging round may be allocated for a plurality of clusters.

The channel state-related information may be included in the poll message. The channel state-related information may include information indicating the total number of the ranging rounds of the DL-TDoA infrastructure where the initiator device sending the poll message belongs and information indicating the channel state of the ranging rounds corresponding to the total number of the ranging rounds.

Each of the plurality of clusters may include a single multi-role device configured to play a role as an initiator in the current ranging round and to play a role as a responder in the ranging round next to the current ranging round.

There may further be included the step of transmitting a poll message in a first ranging round associated with the cluster where the first UWB device belongs in the ranging block. The poll message may include ranging slot length information, ranging subslot length information, and ranging subslot offset information.

The poll message may further include scheduling information for each responder device transmitting the response message in the first ranging round in response to the poll message.

The poll message may further include identification information about the cluster group where the poll message is transmitted, identification information about the cluster where the poll message is transmitted, and information corresponding to the number of at least one inactive ranging round.

The first UWB device may play a role as a global initiator controlling spatial reuse for the DL-TDoA infrastructure where the first UWB device belongs.

Figure 23:
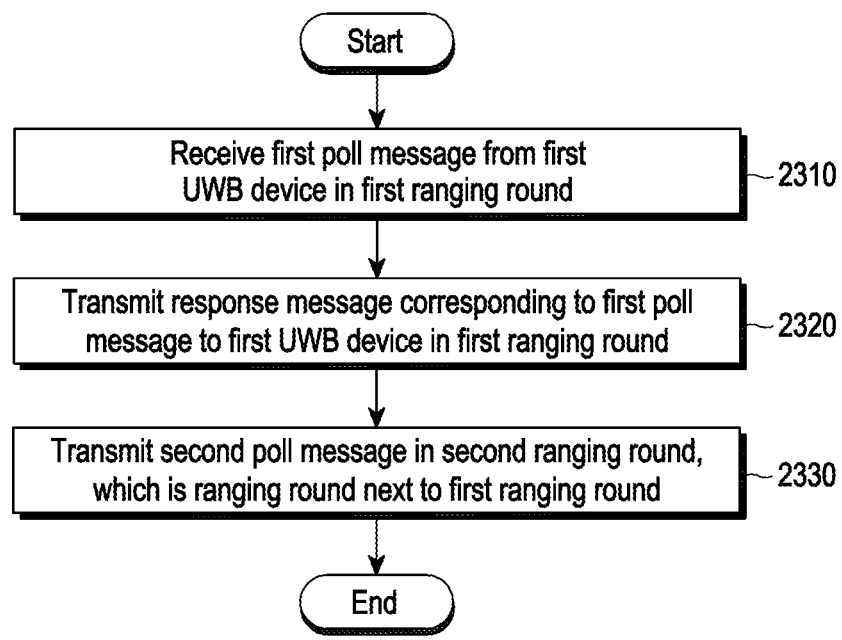
FIG. 23 is a flowchart illustrating a method by a second UWB device according to an embodiment.

FIG. 23 is a flowchart illustrating a method by a second UWB device according to an embodiment.

Referring to FIG. 23, in step 2310, the second UWB device receives a first poll message from the first UWB device in the first ranging round.

In step 2320, the second UWB device transmits a response message corresponding to the first poll message to the first UWB device in the first ranging round.

In step 2330, the second UWB device transmits a second poll message in a second ranging round, which is the ranging round next to the first ranging round.

The first ranging round and the second ranging round each may be allocated for a plurality of clusters.

The first poll message may include ranging slot length information, ranging subslot length information, and ranging subslot offset information.

The first poll message may further include scheduling information for each responder device transmitting the response message in the first ranging round in response to the first poll message.

The first poll message may further include identification information about the cluster group where the first poll message is transmitted, identification information about the cluster where the first poll message is transmitted, and information about the number of active ranging rounds.

The first UWB device may play a role as a global initiator controlling spatial reuse for the DL-TDoA infrastructure where the first UWB device belongs.

Figure 24:
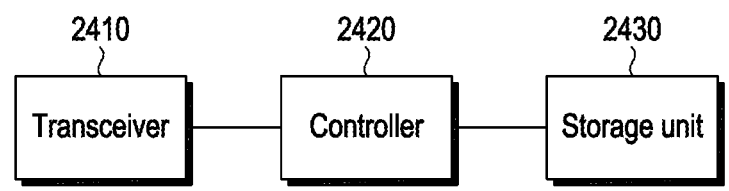
FIG. 24 illustrates a first UWB device according to an embodiment.

FIG. 24 illustrates a first UWB device according to an embodiment.

Referring to FIG. 24, the first UWB device includes a transceiver 2410, a controller 2420, and a storage unit 2430. The controller 2420 may be defined as a circuit, an ASIC, or at least one processor.

The transceiver 2410 may transmit and receive signals to/from another entity. The transceiver 2410 may transmit/receive data to/from another UWB device through, e.g., NB communication, UWB communication or OOB communication (e.g., BLE communication).

The controller 2420 may control the overall operation of the electronic device according to an embodiment. For example, the controller 2420 may control inter-block signal flow to perform the operations according to the above-described flowchart. Specifically, the controller 2420 may control the operations of spatial reuse of time resources described above with reference to FIGS. 1 to 23.

The storage unit 2430, e.g., a memory device, may store at least one of information transmitted/received via the transceiver 2410 and information generated via the controller 2420. For example, the storage unit 2430 may store information and data for the methods described above with reference to FIGS. 1 to 23, e.g., spatial reuse of time resources.

Figure 25:
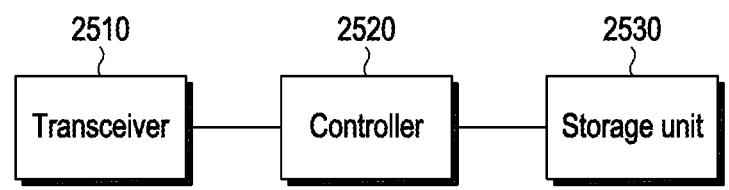
FIG. 25 illustrates a second UWB device according to an embodiment.

FIG. 25 illustrates a second UWB device according to an embodiment.

Referring to FIG. 25, the first UWB device includes a transceiver 2510, a controller 2520, and a storage unit 2530. The controller 2520 may be defined as a circuit, an ASIC, or at least one processor.

The transceiver 2510 may transmit and receive signals to/from another entity. The transceiver 2510 may transmit/receive data to/from another UWB device through, e.g., NB communication, UWB communication or OOB communication (e.g., BLE communication).

The controller 2520 may control the overall operation of the electronic device according to an embodiment. For example, the controller 2520 may control inter-block signal flow to perform the operations according to the above-described flowcharts. Specifically, the controller 2520 may control the operations of spatial reuse of time resources described above with reference to FIGS. 1 to 23.

The storage unit 2530, e.g., a memory device, may store at least one of information transmitted/received via the transceiver 2510 and information generated via the controller 2520. For example, the storage unit 2530 may store information and data necessary for the methods described above with reference to FIGS. 1 to 23, e.g., spatial reuse of time resources.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

Although specific embodiments of the disclosure have been described above, various changes may be made thereto without departing from the scope of the disclosure. Thus, the scope of the disclosure should not be limited to the above-described embodiments, and should rather be defined by the following claims and equivalents thereof.

What is claimed is:

1. A method performed by an ultra-wideband (UWB) device, the method comprising:
receiving, from an initiator anchor of a first cluster, a first poll message, the initiator anchor being a global initiator of a time reference for an inter-cluster synchronization;
performing the inter-cluster synchronization for using a common ranging block with the initiator anchor, based on the first poll message; and
transmitting a second poll message for a second cluster to which the UWB device belongs, the UWB device belonging the first cluster,
wherein the first poll message is transmitted in a first ranging round for the first cluster,
wherein the second poll message is transmitted in a second ranging round for the second cluster, and
wherein the first poll message includes block index information indicating a block index of a ranging block of the first poll message, round index information indicating a round index of the first ranging round, and transmission timestamp information indicating a transmission timestamp of the first poll message.

2. The method of claim 1, wherein the first poll message further includes information for a total number of active ranging rounds, and scheduling information for each responder anchor transmitting a response message in the first ranging round in response to the first poll message.

3. The method of claim 1, wherein the first poll message further includes ranging slot length information, ranging sub-slot length information, and ranging sub-slot offset information.

4. The method of claim 1, wherein the first poll message is transmitted in a ranging slot that is first sent among ranging slots in the first ranging round.

5. The method of claim 4, wherein the first ranging round is a ranging round which is first sent among ranging rounds in the common ranging block.

6. The method of claim 1, wherein the UWB device is configured as an initiator anchor for the second cluster and as a responder anchor for the first cluster.

7. The method of claim 1, wherein the first poll message includes role information for anchors in a plurality of clusters belonging to a downlink (DL)-time difference of arrival (TDoA) network,
wherein the role information indicates a role of a corresponding anchor, and
wherein the role is one of the initiator anchor or a responder anchor.

8. A method by an ultra-wideband (UWB) device, the method comprising:
transmitting a first poll message, the UWB device being configured as an initiator anchor of a first cluster and a global initiator of a time reference for an inter-cluster synchronization and the inter-cluster synchronization being performed for using a common ranging block; and
receiving, from at least one responder anchor, a first response message corresponding to the first poll message,
wherein the first poll message is transmitted in a first ranging round for the first cluster, and
wherein the first poll message includes block index information indicating a block index of a ranging block of the first poll message, round index information indicating a round index of the first ranging round, and transmission timestamp information indicating a transmission timestamp of the first poll message.

9. The method of claim 8, further comprising determining a reference time for the inter-cluster synchronization, based on channel state-related information received from one or more initiator anchors.

10. The method of claim 9, wherein the channel state-related information is included in a poll message, and
wherein the channel state-related information includes information indicates a channel state of at least one ranging round.

11. The method of claim 9, wherein the reference time corresponds to a start time of the common ranging block.

12. The method of claim 8, wherein the first poll message further includes information for a total number of active ranging rounds, and scheduling information for each responder anchor transmitting a response message in the first ranging round in response to the first poll message.

13. The method of claim 8, wherein the first poll message includes role information for anchors in a plurality of clusters belonging to a downlink (DL)-time difference of arrival (TDoA) network,
wherein the role information indicates a role of a corresponding anchor, and
wherein the role is one of the initiator anchor or a responder anchor.

14. The method of claim 8, wherein the first poll message further includes ranging slot length information, ranging sub-slot length information, and ranging sub-slot offset information.

15. The method of claim 8, wherein the first poll message is transmitted in a ranging slot which is first sent among ranging slots in the first ranging round.

16. The method of claim 15, wherein the first ranging round is a ranging round which is first sent among ranging rounds in the common ranging block.

17. An ultra-wideband (UWB) device, comprising:
a transceiver; and
at least one processor configured to:
receive, from an initiator anchor of a first cluster, a first poll message, the initiator anchor being a global initiator of a time reference for an inter-cluster synchronization,
perform the inter-cluster synchronization for using a common ranging block, based on the first poll message, and
transmit a second poll message for a second cluster to which the UWB device belongs, the UWB device belonging the first cluster,
wherein the first poll message is transmitted in a first ranging round for the first cluster, wherein the second poll message is transmitted in a second ranging round for the second cluster, and wherein the first poll message includes block index information indicating a block index of a ranging block of the first poll message, round index information indicating a round index of the first ranging round, and transmission timestamp information indicating a transmission timestamp of the first poll message.

18. The UWB device of claim 17, wherein the first poll message further includes information for a total number of active ranging rounds, and scheduling information for each responder anchor transmitting a response message in the first ranging round in response to the first poll message.

19. The UWB device of claim 17, wherein the first poll message is transmitted in a ranging slot which is first sent among ranging slots in the first ranging round, and wherein the first ranging round is a ranging round which is first sent among ranging rounds in the common ranging block.

20. The UWB device of claim 17, wherein the UWB device is configured as an initiator anchor for the second cluster and as a responder anchor for the first cluster.

* * * * *